(12) United States Patent
Parr

(10) Patent No.: US 6,286,459 B1
(45) Date of Patent: Sep. 11, 2001

(54) LITTER CONTAINER WITH ROTARY MOVEMENT SIEVE

(76) Inventor: Michael J. Parr, 41 Old English Lane, Thornhill Ontario (CA), L3T 2V2

(*) Notice: Subject to any disclaimer, the term of this patent is extended or adjusted under 35 U.S.C. 154(b) by 0 days.

(21) Appl. No.: 09/407,297

(22) Filed: Sep. 29, 1999

Related U.S. Application Data

(60) Provisional application No. 60/105,078, filed on Oct. 21, 1998, and provisional application No. 60/118,489, filed on Feb. 3, 1999.

(51) Int. Cl.[7] .................................................. A01K 29/00
(52) U.S. Cl. .......................... 119/166; 119/168; 119/163
(58) Field of Search ................................ 119/166, 161, 119/163, 167, 168

(56) References Cited

U.S. PATENT DOCUMENTS

| | | | | |
|---|---|---|---|---|
| 4,120,264 | * | 10/1978 | Carter | 119/166 |
| 4,190,525 | * | 2/1980 | Menzel | 209/235 |
| 4,327,667 | * | 5/1982 | Bilak | 119/166 |
| 4,627,382 | * | 12/1986 | Muzzey | 119/165 |
| 4,817,560 | * | 4/1989 | Prince et al. | 119/166 |
| 4,846,104 | * | 7/1989 | Pierson, Jr. | 119/166 |
| 5,048,464 | * | 9/1991 | Shirley | 119/166 |
| 5,048,465 | * | 9/1991 | Carlisi | 119/166 |
| 5,220,886 | * | 6/1993 | Hyde | 119/165 |
| 5,226,388 | * | 7/1993 | McDaniel | 119/166 |
| 5,259,340 | * | 11/1993 | Arbogast | 119/166 |
| 5,582,134 | * | 12/1996 | Simmons | 119/166 |
| 5,782,203 | * | 7/1998 | Tennen | 119/166 |

* cited by examiner

Primary Examiner—Charles T. Jordan
Assistant Examiner—Judith A. Nelson
(74) Attorney, Agent, or Firm—Bereskin & Parr

(57) ABSTRACT

A circular cat litter container where a sieving mechanism is attached to a rotatable ring atop the container. The circular motion of the ring moves the sieve throughout the entire contents of the litter container capturing any solid waste that is too large to pass through the sieve. The sieve mechanism has axis of movement such that the sieve can be folded out of the way of the contents of the container when the sieve is not in use. The container and sieving mechanism are designed such that the sieve automatically moves into a scooping position when the ring is rotated in a clockwise motion. Conversely, when the ring and sieve are rotated counterclockwise, the sieve automatically is placed in an "out of the way" or resting position. The sieving mechanism is removably attached to the rotatable ring such that the sieve serves to act as a litter scoop to remove and discard the solid waste material found in the litter container. If desired the litter container can be made oval or rectangular with rounded corners and the ring can be replaced by a carriage moving along a track on the container sidewall and supporting the sieving mechanism. Also if desired, the container sidewall can be made non-continuous and the litter can be discharged through a gap into an auxiliary container at each end of its movement.

8 Claims, 26 Drawing Sheets

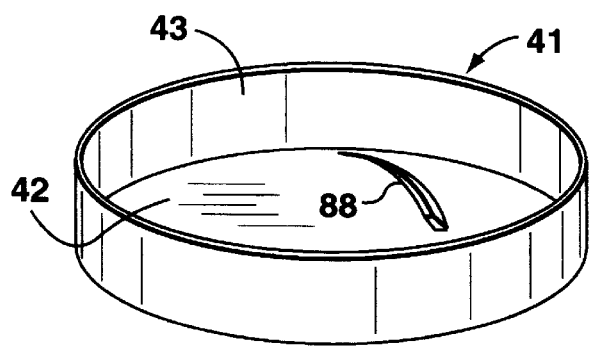
FIG. 2
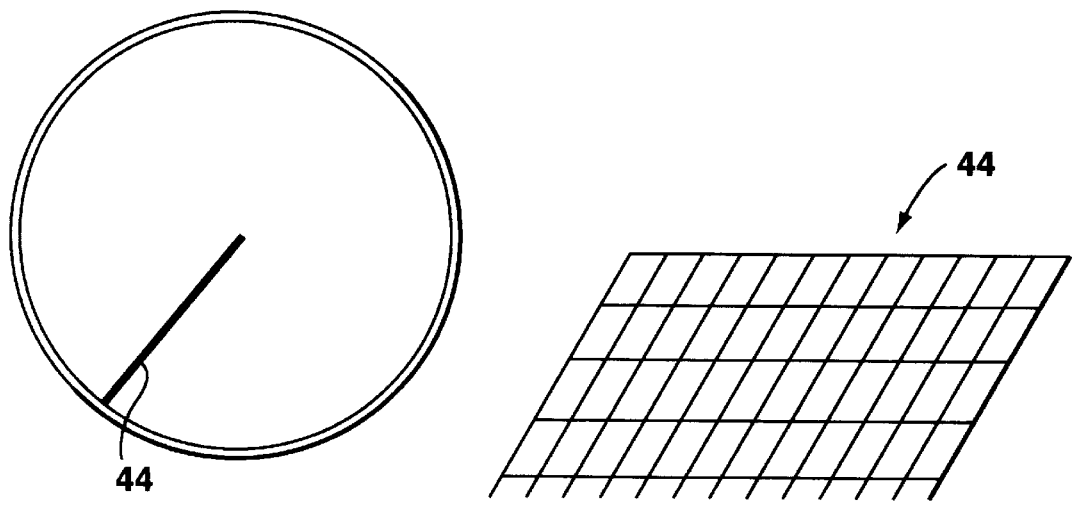
FIG. 3  FIG. 4

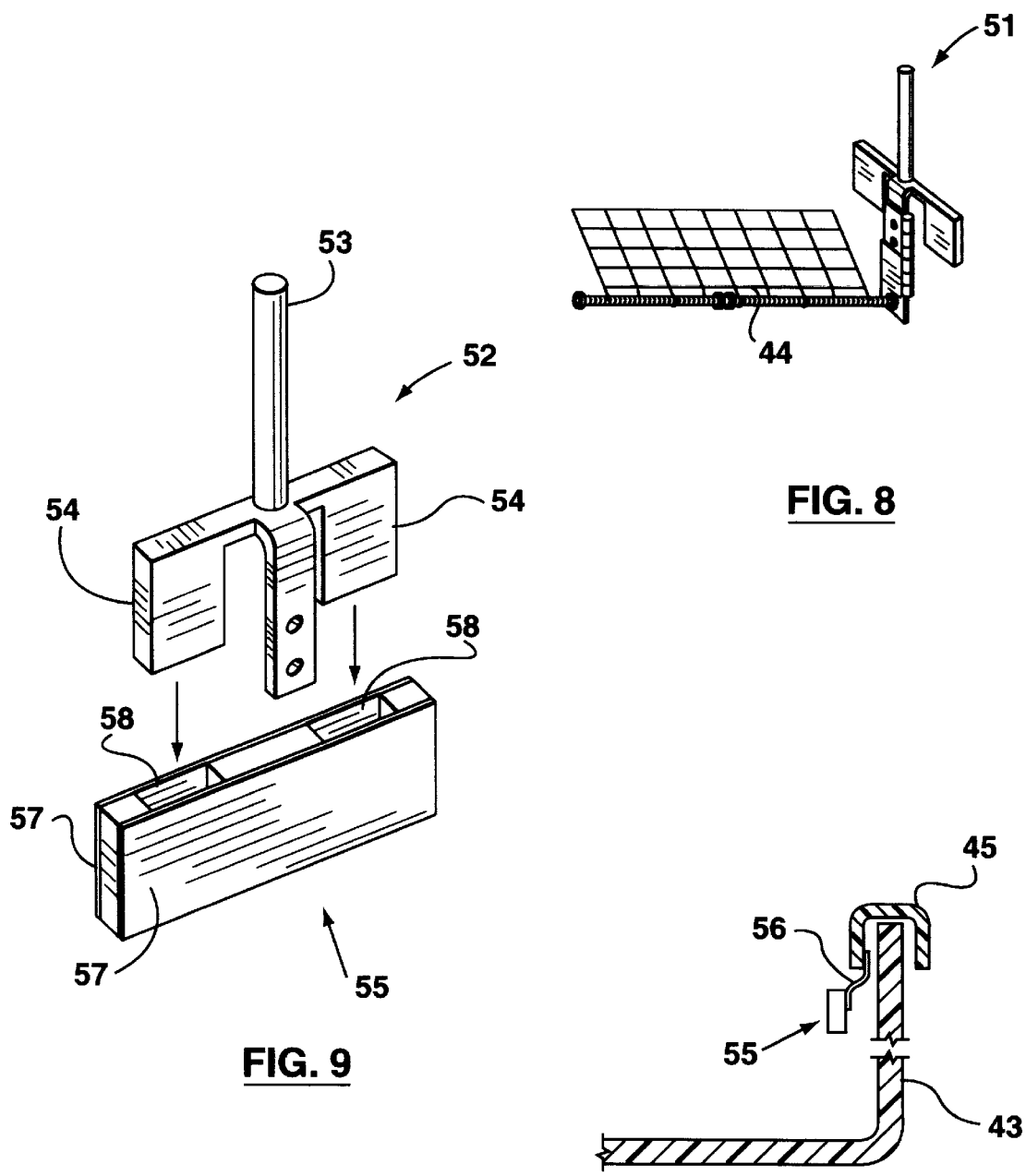

ofLITTER CONTAINER WITH ROTARY
MOVEMENT SIEVE

PRIOR APPLICATION

This application claims the benefit of U.S. Provisional Application Serial No. 60/105,078, filed Oct. 21, 1998 entitled "LITTER CONTAINER WITH ROTARY MOVEMENT SIEVE" and of U.S. provisional application serial No. 60/118,489 filed Feb. 3, 1999.

FIELD OF THE INVENTION

This invention relates to a cat litter container that is designed to ease the task of finding and removing solid waste that is in the litter.

BACKGROUND OF THE INVENTION

Cat owners commonly use litter boxes for their cats to use as a bathroom. Increasingly popular fillers for these boxes are clumping cat litters. Clumping litters have the characteristic that when the granules that make up the litter are wetted; these granules will stick together to form a solid or semi solid clump. These clumps of wetted litter or waste, including the solid extrement of the animal are then removed via a scoop, essentially leaving the litter box in a clean state. The scoop is typically in the form of a sieve that lets the unused or clean litter granule pass through but not the larger clumps of waste. Typically the scoop must be run throughout the contents of the litter to find the waste as cats normally bury or cover their extrement. The scoop is normally stored somewhere outside of the litter container.

Attempts have been made to simplify the task of finding and removing the waste. Examples of such attempts are shown in the following U.S. patents.

U.S. Patent Documents

U.S. Pat. No. 5,782,203 Animal Litter Scoop Retaining System
U.S. Pat. No. 5,259,340 Automatic or semiautomatic cat litter box
U.S. Pat. No. 5,220,886 Litter box accessory
U.S. Pat. No. 5,226,388 Automated cat litter disposal system
U.S. Pat. No. 5,048,465 Self-cleaning kitty litter box
U.S. Pat. No. 5,048,464 Self cleaning litter system
U.S. Pat. No. 4,846,104 Automated cat toilet
U.S. Pat. No. 4,627,382 Disposable litter box
U.S. Pat. No. 4,327,667 Cat Toilet Assembly
U.S. Pat. No. 4,190,525 Litter and refuse receptacle and separator
U.S. Pat. No. 4,120,264 Sanitary Facility for Pets This invention is intended to alleviate problems that have arisen with other litter boxes. These problems include unsanitary litter scoops that must be stored outside of the litter box, unsanitary litter box conditions should a person miss scooping out waste that is buried in the litter, and the time consumption needed to scoop through the entire contents of the litter box to find all of the buried excrement.

BRIEF SUMMARY OF THE INVENTION

In one of its aspects the invention provides a litter box comprising a method for sieving the entire contents of a round litter box where a sieving mechanism incorporating a screen is passed throughout the entire contents of the litter box via a rotational movement trapping solid waste. In another aspect the sieving mechanism also acts as a litter scoop that can be removed from the container, and the waste contained within the screen is then disposed of. In yet another aspect the sieving mechanism can be reinserted into the litter box and rotated in the direction opposite to the trapping movement causing the sieve to lie close to the side of the litter box, relatively out of the way of an animal using the litter box.

In another aspect the invention is identical in function to that described above. However, in this embodiment, the counter-rotational movement of the sieving mechanism causes the screen to lie relatively flat against the bottom of the litter box, out of the way of an animal that may use the litter box.

In another aspect, the invention provides a litter container having a bottom wall and a continuous sidewall, said sidewall providing a track, a carriage mounted on said sidewall for travel along said track, and a sieve supported on said carriage for travel throughout the litter material and the container as said carriage travels around said sidewall.

In another aspect, the invention provides a litter container having a bottom wall and a sidewall extending around at least 180 degrees of arc, a carriage mounted on said sidewall for movement along substantially the entire length of said sidewall, and a sieve supported on said carriage for travel throughout the litter material in the container.

Further objects and aspects of the invention will appear from the following description, taken together with the accompanying drawings.

BRIEF DESCRIPTION OF THE DRAWINGS

FIG. 2 is a perspective view of a litter container of the embodiment of FIG. 1;

FIG. 3 is a top view of the container with the sieve shown therein;

FIG. 4 is a diagrammatic perspective view of the sieve of the FIG. 1 embodiment;

FIG. 8 is a perspective view of the sieve unit;

FIG. 9 is an exploded view of the handle unit and the receptacle for the sieve unit;

FIG. 10 is a sectional view showing the manner in which the receptacle of FIG. 9 is attached to the ring;

FIG. 11-A is an enlarged view showing the hinge mechanism of the sieve unit;

FIG. 26-A is a perspective view showing sieve unit with extrement on the sieve and showing how the locking tab falls over the locking member to keep the screen or sieve from swinging outwardly on the hinge;

DETAILED DESCRIPTION OF THE PREFERRED EMBODIMENT

Figure 1:
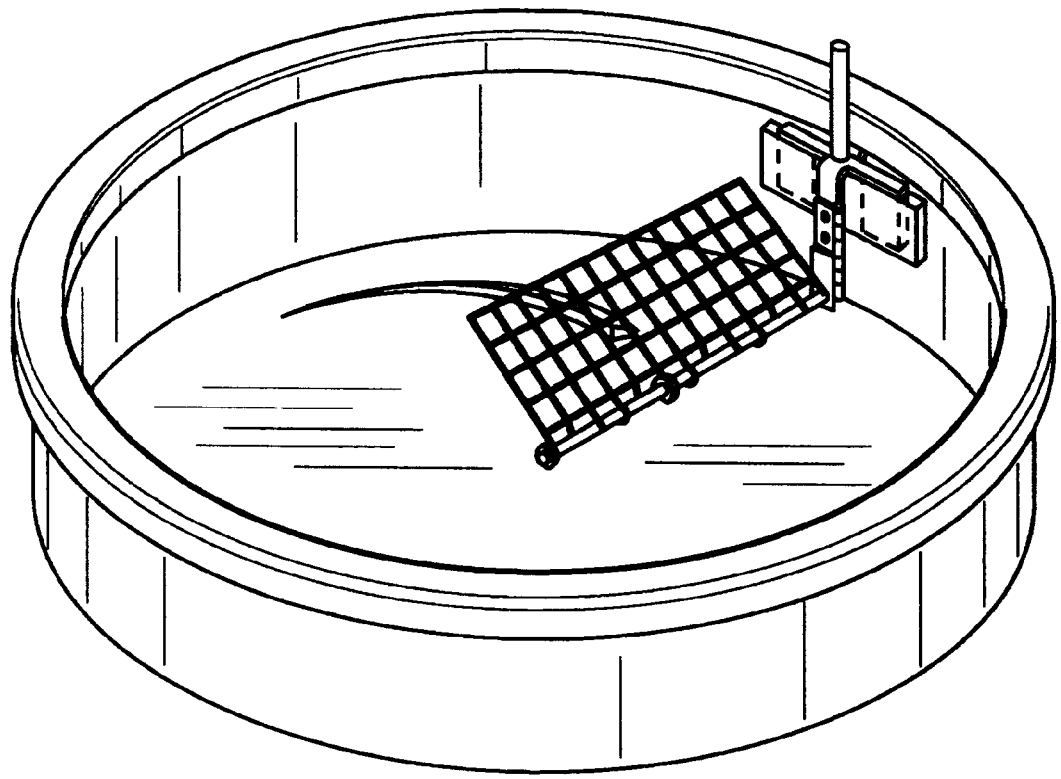
FIG. 1 is a perspective view of a first embodiment of the invention.

The invention in a preferred form uses as its major component a round litter container 41 as shown in FIGS. 1 and 2. The container 41 includes a circular flat bottom surface 42 with an encircling sidewall 43 which surrounds the entire bottom surface 42. The sidewall 43 is perpendicular to the bottom surface 42.

Figure 5:
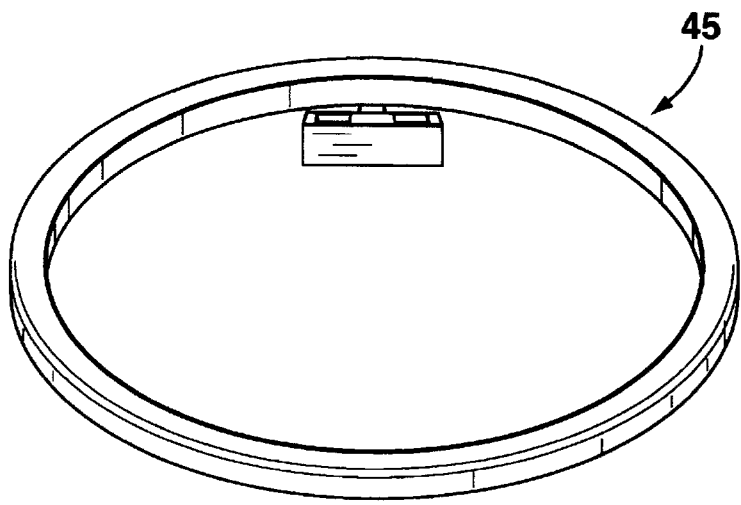
FIG. 5 is a perspective view of the ring of the FIG. 1 embodiment, removed from the container sidewall on which it normally sits.
Figure 6:
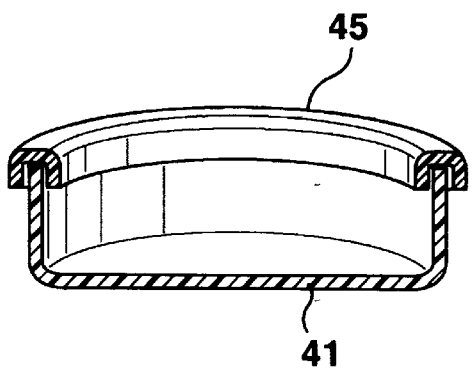
FIG. 6 is a perspective view, partly in section, of the ring in place on the upper edge of the sidewall of the FIG. 1 embodiment.

Located within the container 41 is a sieve or screen as shown in FIG. 3. FIG. 4 shows the screen or sieve 44 itself for clarity. The sieve or screen 44 is supported within the container 41 by being attached to a movable circular ring 45, separately shown in FIG. 5, which sits atop the side wall 43 of the litter container 41 as shown in FIG. 6.

Figure 7:
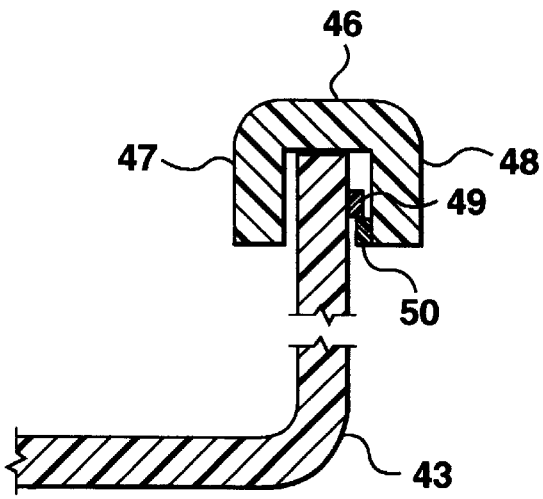
FIG. 7 is an enlarged sectional view of portion of the FIG. 6 view.

The ring 45 includes a top wall 46 and two sidewalls 47,48, thus having a U-shaped configuration and profile as shown in FIG. 7. The inside wall 47 and the outside wall 48 of the ring 45 are spaced apart sufficiently so that the ring 45 fits over and rests on the top of the sidewall 43 of the container 41. The circular ring 45 turns freely on top of the litter container 41 but is locked onto the top of the container 41 such that the ring 45 can only be removed from the container 41 by using several pounds of force. The container sidewall 43 thus forms a track for ring 45.

FIG. 7 shows how the ring 45 and container 41 lock together. The container 41 has an outside ridge 49 that circles the sidewall adjacent its top. The inside surface of the outside wall 43 of the ring 45 has an inside ridge 50, which protrudes inwardly. When the ring 45 is pushed on to the top of the container 41 with some force, the inside ridge 50 on the ring 45 and the outside ridge 49 on the container 41 move past each other, locking the ring 45 onto the container 41. The ring 45 and the container 41 are both made of plastic, which allows some flexing of the surfaces, to allow the ridges to pass one another either to engage or remove the ring 45 from the container 41. However several pounds of force are required to remove the ring 45, so that the ring 45 will not be inadvertently pulled of the top of the container 41 when the ring 45 is being rotated.

The sieve or screen 44 forms part of a sieving unit 51 best shown in FIGS. 8 to 10. The sieving unit 51 includes a handle unit 52, which is shown in FIG. 9 without the sieve or screen 44 attached. The handle unit 52 includes an upright projecting grip 53 portion intended for gripping by the user, and a pair of flat prongs 54, aligned in a single plane, which fit snugly into a pair of slots 58 in a receptacle 55 built into the ring 45 and movable with the ring 45. FIG. 9 shows the receptacle 55 detached from the ring for clarity.

As shown in FIG. 9, the receptacle 55 consists of two metal plates 57 spaced apart from each other by a distance slightly greater than the width of the prongs 54 which will be inserted into these slots or spaces 58. The length of the slots 58 is also equal with a slight clearance to the length of the prongs 54. The prongs 54 thus have a secure and snug fit once they are inserted into the slots 58.

The receptacle 55 is attached to the ring 45 as shown in FIG. 10, with the aid of an upwardly extending metal support 56 which also projects inwardly to lie against the inside surface of the inner wall 43 of the ring 45. The upwardly extending support 56, which may be made of metal, may be attached to the ring 45 with strong glue.

Figure 11:
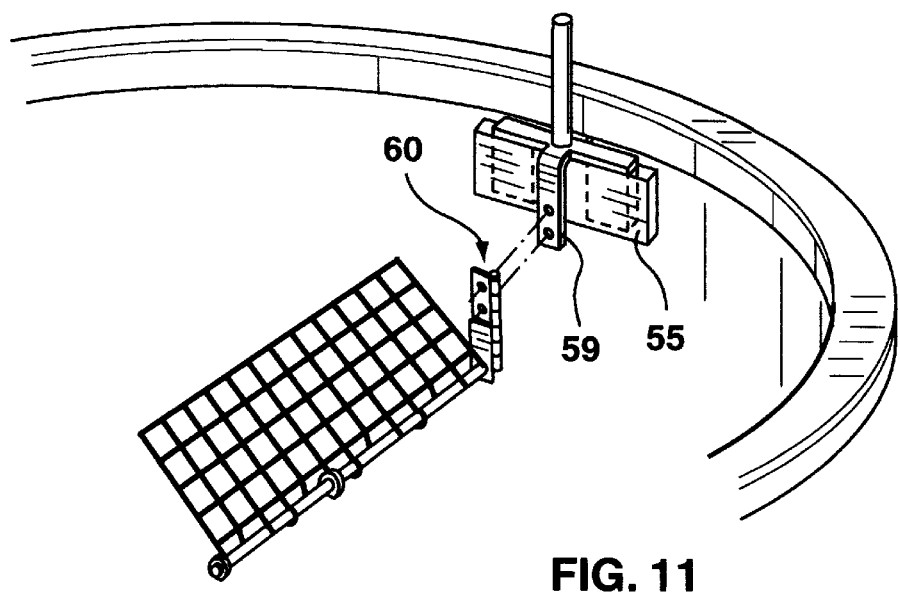
FIG. 11 is a perspective view showing the sieve disassembled from the handle unit, in the container.
Figure 11A:
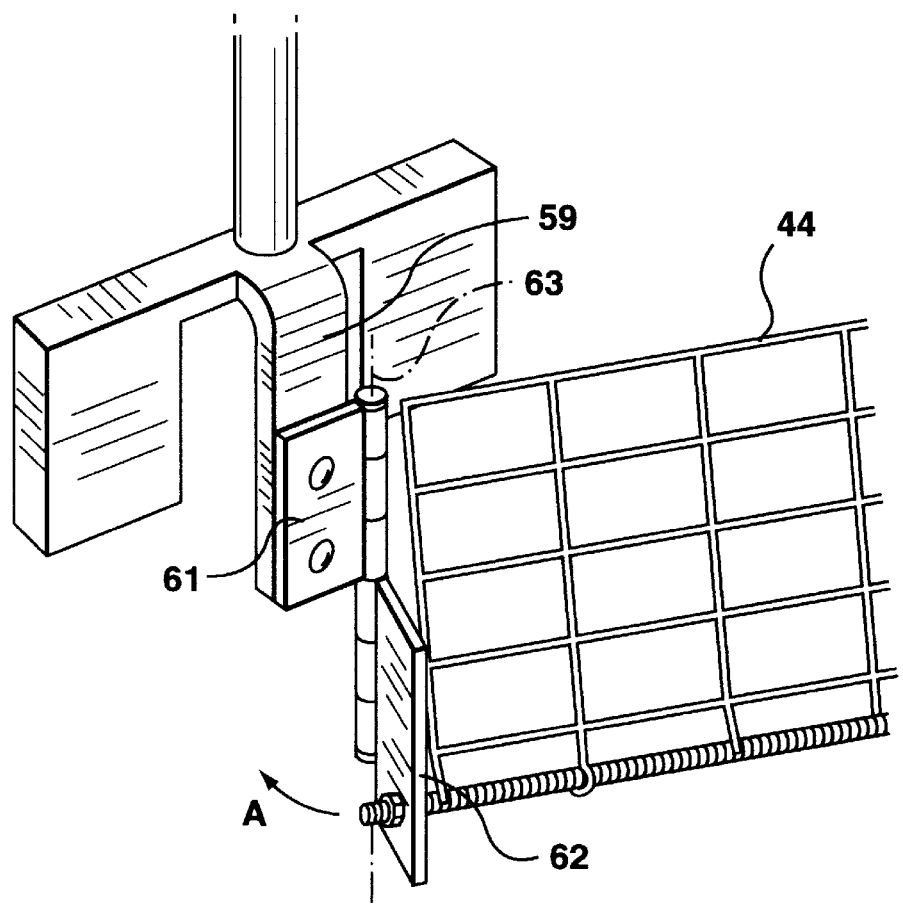

The sieve 44 is attached to the handle unit 52 by means of a downwardly extending projection 59, parallel to the prongs 54 as shown in FIG. 9. The projection 59 extends radially inwardly to ride over the receptacle 55 and is attached to the sieve 44 by a hinge 60 best shown in FIGS. 11 and 11-A. In FIG. 11 the hinge 60 is detached from the downward projection 59 for clarity.

The hinge 60 has two hinge leaves 61 and 62, joined by a vertical hinge axis 63 as shown in FIG. 11-A. One hinge leaf 61 is connected by any desired means to the downwardly extending projection 59, while the other is secured again by any desired means to the sieve or screen 44. This allows the sieve or screen 44 to fold inwardly and outwardly in the direction of arrow A.

The structure of the sieve unit 51 will next be described.

Figure 12:
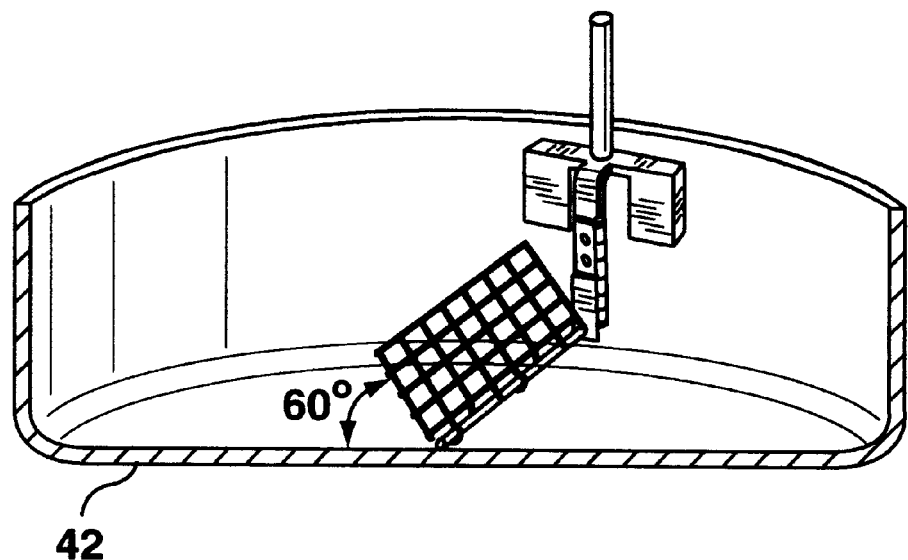
FIG. 12 is a perspective showing the sieve in its trapping position, rotated in a clockwise direction and oriented at 60 degrees to the horizontal.
Figure 13:
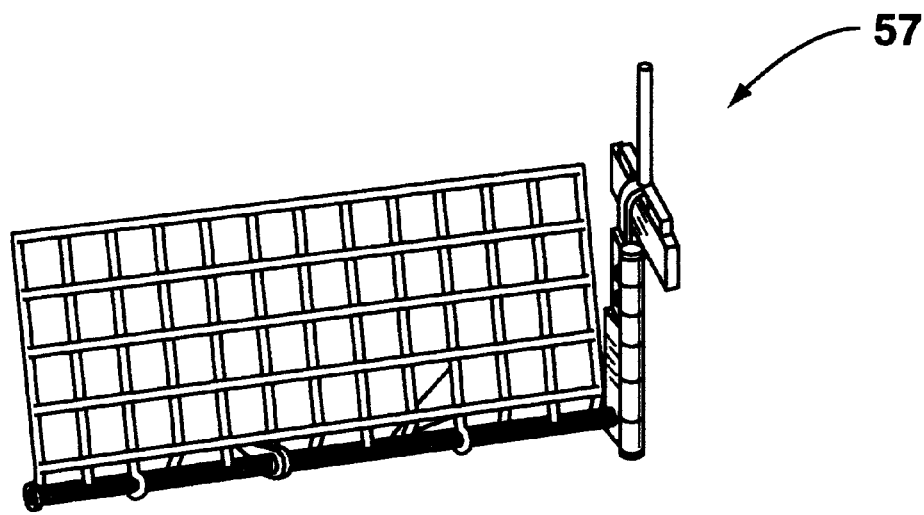
FIG. 13 is a perspective view of the sieve unit, also showing the sieve in a 60 degree to the horizontal position ready for trapping extrement.
Figure 14:
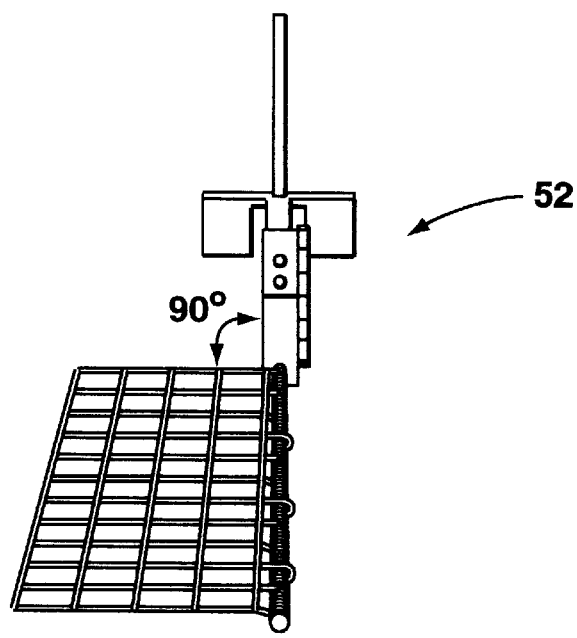
FIG. 14 is a perspective view showing the sieve unit with the sieve in a horizontal position.
Figure 15:
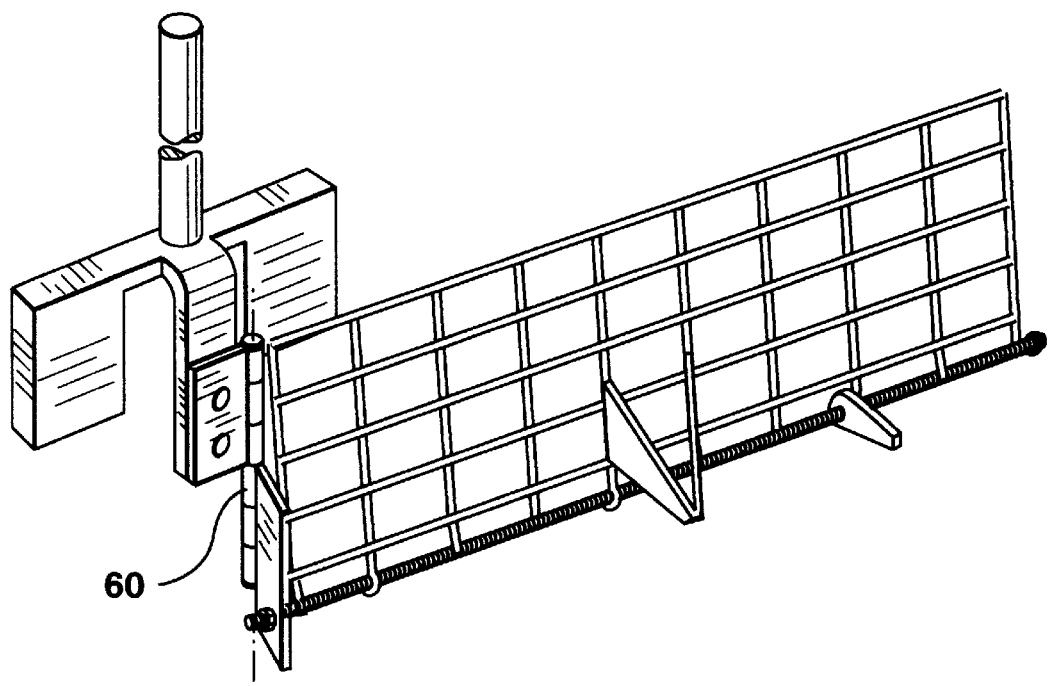
FIG. 15 is a perspective view of the sieve unit showing the sieve in a vertical position.
Figure 18:
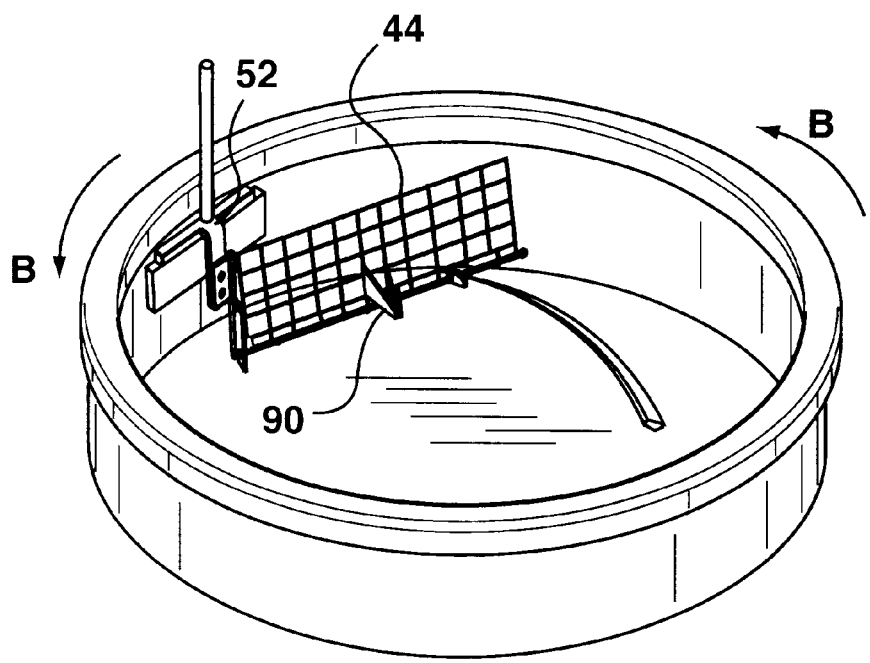
FIG. 18 is a perspective view showing the sieve unit with the sieve folded against the side of the container.
Figure 19:
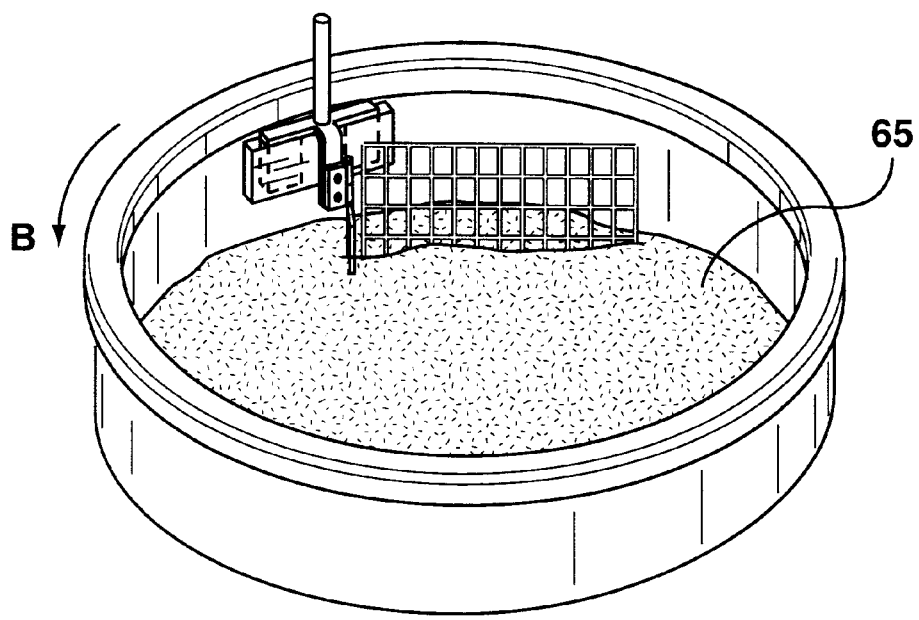
FIG. 19 is a perspective view similar to FIG. 18 with litter in the container.

The sieve unit can assume several positions to perform several functions as described in this paragraph. When sieving the contents of the litter container the screen 44 is positioned radially to the container wall 43 with the screen at approximately a 60-degree angle from the container's bottom 42 as shown in FIGS. 12 and 13. This 60-degree angle serves to bring buried solids up to surface of the litter as the screen 44 is moved through the litter. After the screen has collected the waste, the sieving unit 51 acts as a litter scoop to lift up and dispose of the contained waste. For this lifting function, the screen 44 assumes a 90-degree position, perpendicular to the handle unit 52 (i.e. horizontal) as shown in FIG. 14. When not in use, i.e. in a resting position where an animal may use the litter container 41, the screen 44 is positioned at a 90-degree angle from container bottom 42 and relatively flat against the container wall 43. FIGS. 15, 18 and 19 show the sieve unit in this resting position with the hinge 60 in an opened position.

Figure 16:
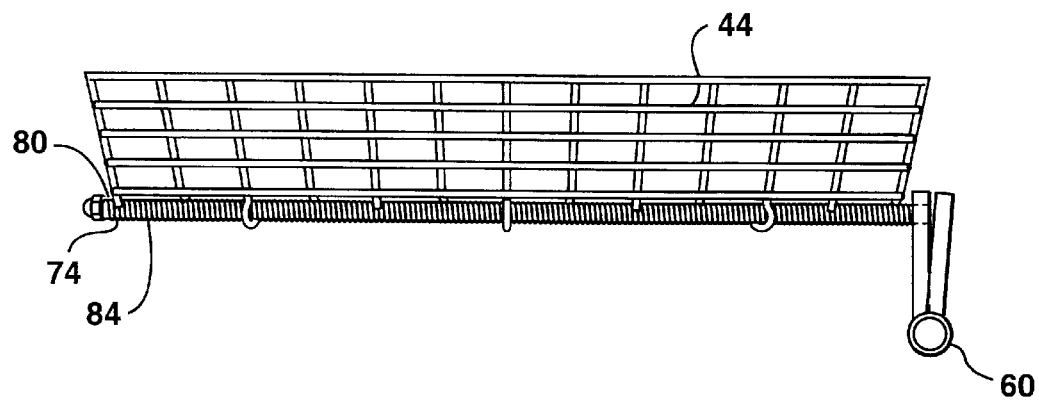
FIG. 16 is a top view showing the sieve unit and parts therefor.
Figure 17:
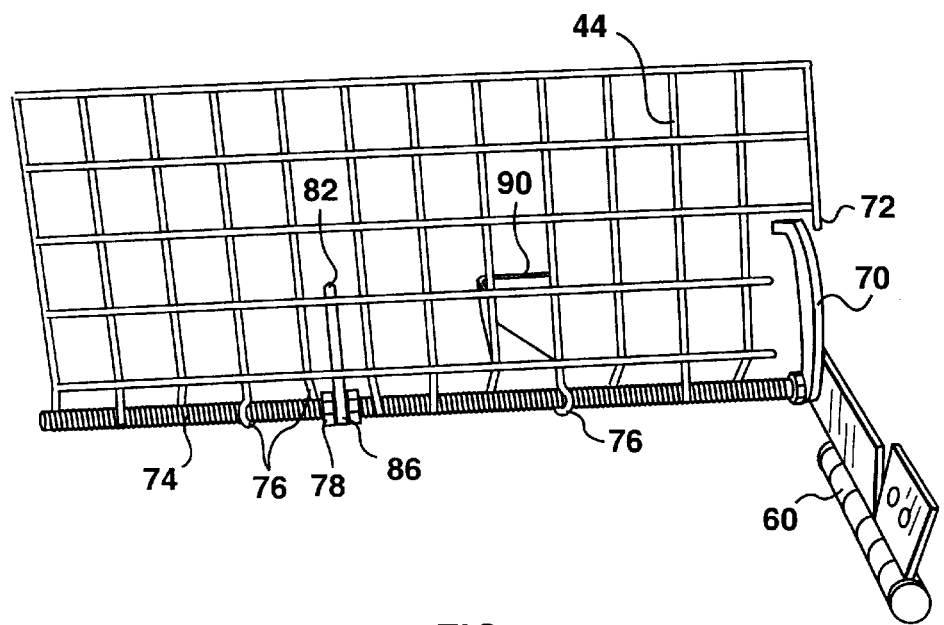
FIG. 17 is a perspective view showing the sieve unit and the various parts thereof.

The parts of the sieve unit 51 as shown in FIGS. 16 and 17 will now be described. How these parts cause the sieve unit to function is described in subsequent paragraphs. The sieve or screen 44 obtain different positions via two hinge points. The first hinge point is where the sieve 44 is attached to the bottom 42 of the projection on the handle unit 52 by the hinge 60, which has a vertical hinge axis. When the hinge 60 is in the closed position the sieve unit is in a radial and extended position. A locking member 70 that does not move with the hinged sieve is fixed to the handle unit 52. When removing the sieving unit 51 from the ring 45, a locking tab 72 located on the screen 44 passes over the locking tab 70. This keeps the screen from swinging outwardly on the hinge 60 thereby keeping the screen 44 perpendicular to the handle unit 52. The screen 44 itself is hinged on a threaded metal rod 74. This second hinge axis is created by wrapping ends of the metal grid work 76 that make up the screen around the rod 74. The screen 44 is therefore rotatable around the rod 74. The screen 44 is kept from sliding along the length of the rod 74 by abutting two ends of the screen's gridwork 76 up against two nuts 78 which are fixed in position on the rod 74. The rod 74 is fixed to the hinge 60 such that when the hinge 60 is closed the rod 74 extends radially from the handle unit 52. Affixed to the trailing side 80 of the rod 74 by nuts 78 is a horizontal stop member 82. This member 82 keeps the screen 44 from falling below a 90-degree (i.e. horizontal) angle when the sieving unit 51 is removed from the ring 45. Attached to the forward side 84 of the rod 74 by nuts is a guide member 86. This guide member 86 will follow a guide track 88 located on the container bottom that serves to bring the sieve 44 from its resting position against the container wall 43 to a sieving position. Attached to the screen 44 is a primary positioning member 90. This piece serves two functions. As shown in FIG. 12 it keeps the screen 44 in a 60-degree position when sieving by supporting the screen 44 against the container bottom 42. Then, when the direction of rotation of the sieve unit is reversed and the relative movement of the litter 65 pushes the screen 44 upward, the primary positioning member 90 serves to help move the screen 44 to the resting position. The resting position of the sieve close to the container wall 43 is shown in FIG. 15.

The following paragraphs describe the functioning of the sieve unit 51.

FIGS. 18 and 19 show the screen 44 in a resting position resulting from the ring 45 and sieving unit 51 being turned in a counterclockwise motion as shown by Arrow B. The relative motion of the sieving unit 51 through the litter 65 pushes the litter against both the screen 44 and the primary positioning member 90. This causes the screen 44 to rotate on the rod 74 to a vertical position, and to rotate on the hinge 60 to a position against the container wall 43. The movement of the screen 44 around the rod 74 is restricted to 90 degrees, relative to the bottom surface 42 of the container 41, by the screen 44 coming to a stop against the handle unit 52.

Figure 20:
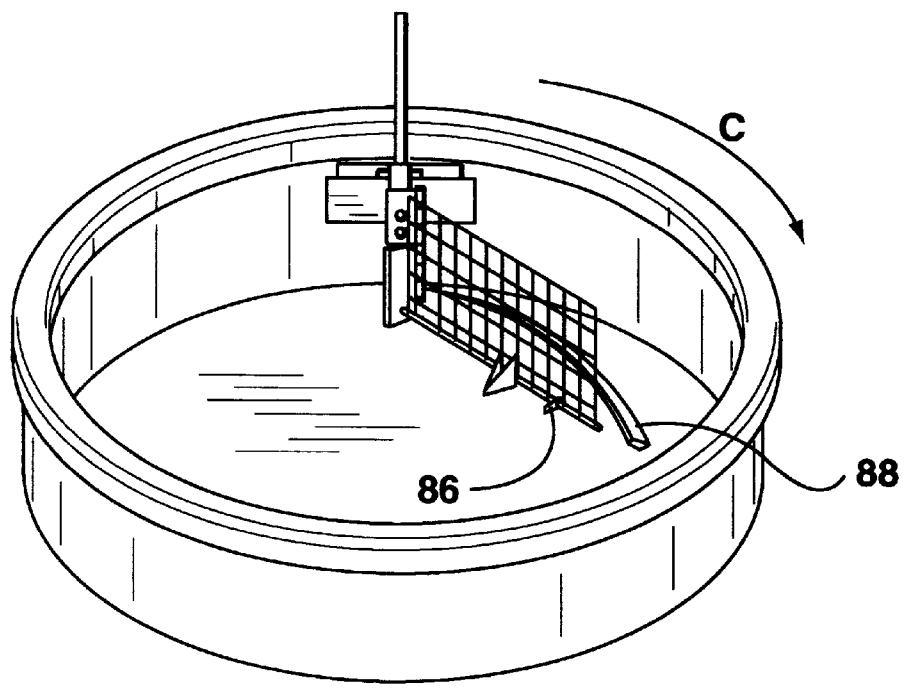
FIG. 20 is a perspective view showing the sieve unit with the sieve partly moved outwardly from its stored position against the sidewall of the container.
Figure 21:
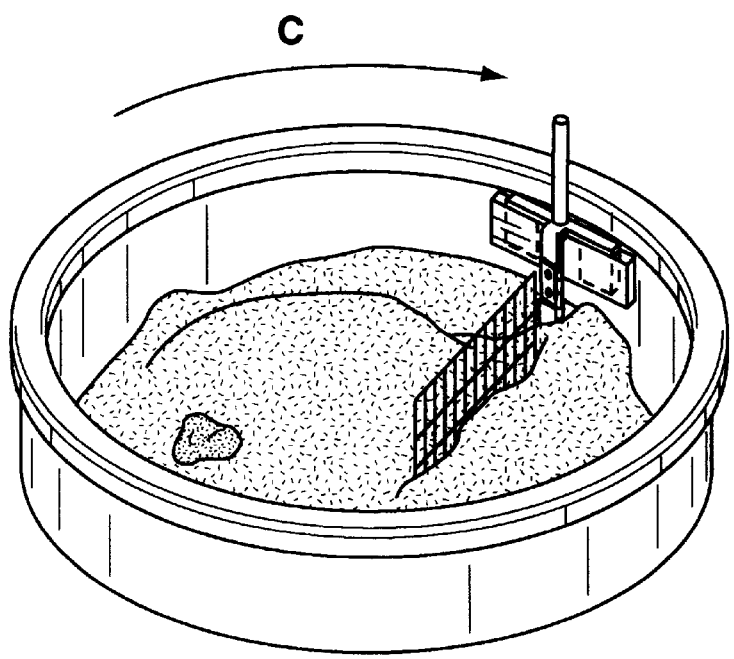
FIG. 21 is a perspective view showing the sieve moved further out into an operating position from its stored position.
Figure 22:
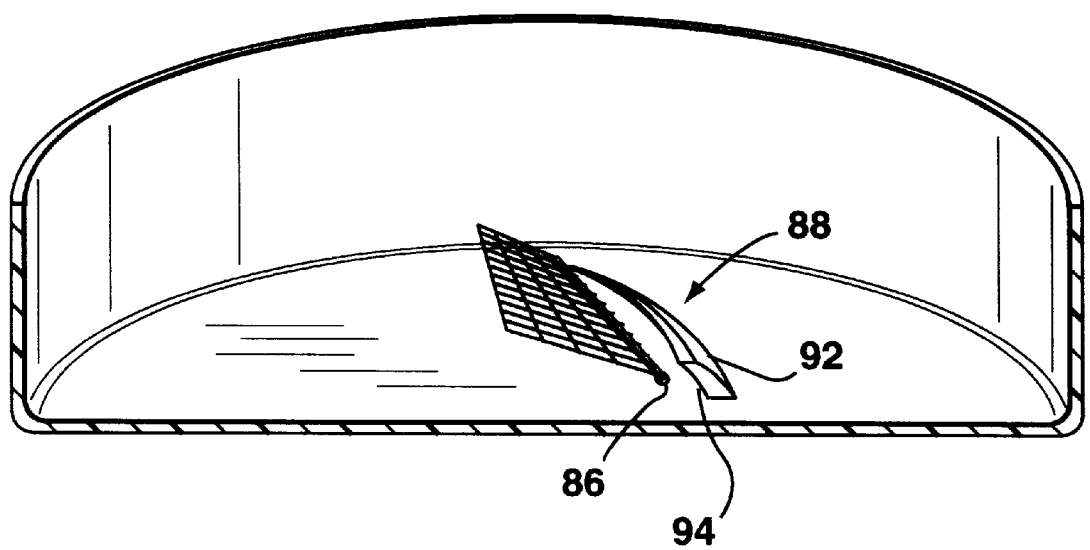
FIG. 22 is a perspective view, partly in section, showing the sieve and the track on the container bottom wall which helps to move the sieve outwardly into operating position.

FIGS. 20 and 21 show the screen 44 moving from the resting position to a sieving position as the ring 45 and sieving unit 51 is rotated clockwise in the direction of Arrow C. The guide member 86 catches the guide track 88 that is affixed to the container bottom 42. This causes the sieve 44 to move outward from the wall 43 as shown. FIG. 22 shows the guide track in more detail. The guide track 88 is made from a piece of plastic that is attached to the container bottom 42 with glue and extends from the container wall 43 into the container 41 in an arc. The front surface 92 of the track is angled upwardly such that when the sieve mechanism 51 is rotated counter clockwise the guide member 86 and sieve 44 can lift over the guide track 88. When the sieve unit 51 is rotated clockwise the back part 94 of the track, which is built like a wedge, catches the guide member 86 whose forward surface is also shaped like a wedge to catch the track 88. When the guide member 86 has been caught in the wedge of the track and the sieve unit 51 continues to be rotated clockwise the sieve 44 must move outwardly from the container wall 43 until the guide member 86 becomes free of the track 88. As the guide member 86 reaches the end of the track 88 the force of the relative movement the litter 65 pushing against the screen 44 helps move the screen 44 outward into the radial position. Although only one track 88 is shown, multiple tracks may be used.

Figure 23:
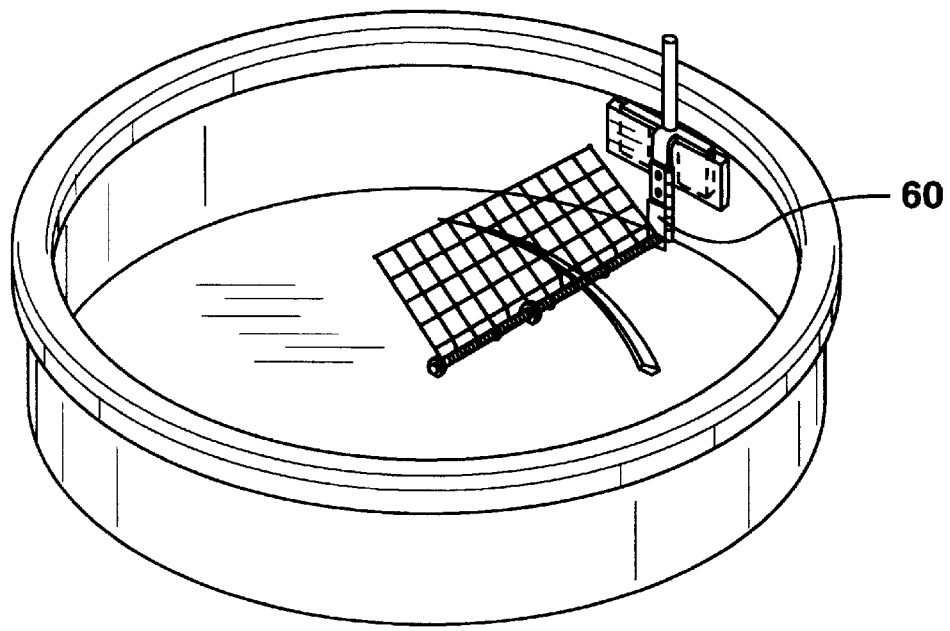
FIG. 23 is a perspective view showing the sieve and the container in full sieving position.
Figure 24:
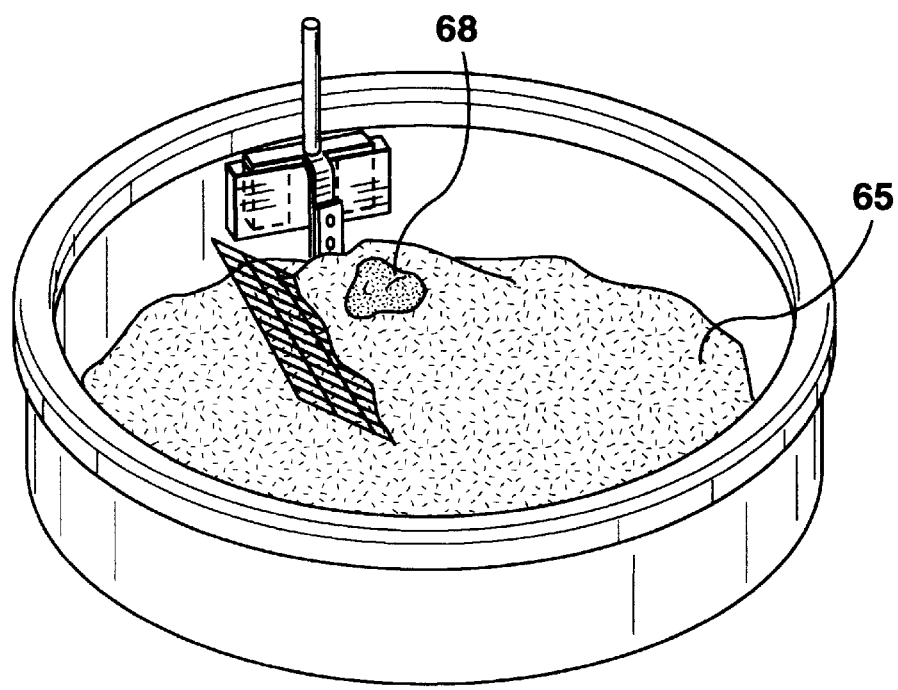
FIG. 24 is a view similar to that of FIG. 23 but with litter in the container.

FIGS. 23 and 24 show the screen having assumed its maximum outwardly position as the ring continues to be rotated clockwise in a scooping operation. The hinge 60 has closed thereby placing the screen in a position approximately radial to the side of the container. The force of the litter 65 against the screen 44 has rotated the screen 44 around the metal rod 74 to an angle of approximately 60 degrees from the container bottom 42. This is where the primary positioning member 90 stops against and rests upon the container bottom 42, supporting the screen 44. As the screen 44 moves through the litter 65 it traps solids 68 against its front surface. The angle of the screen 44 causes the solids 68 to rise to the surface of the litter 65.

Figure 25:
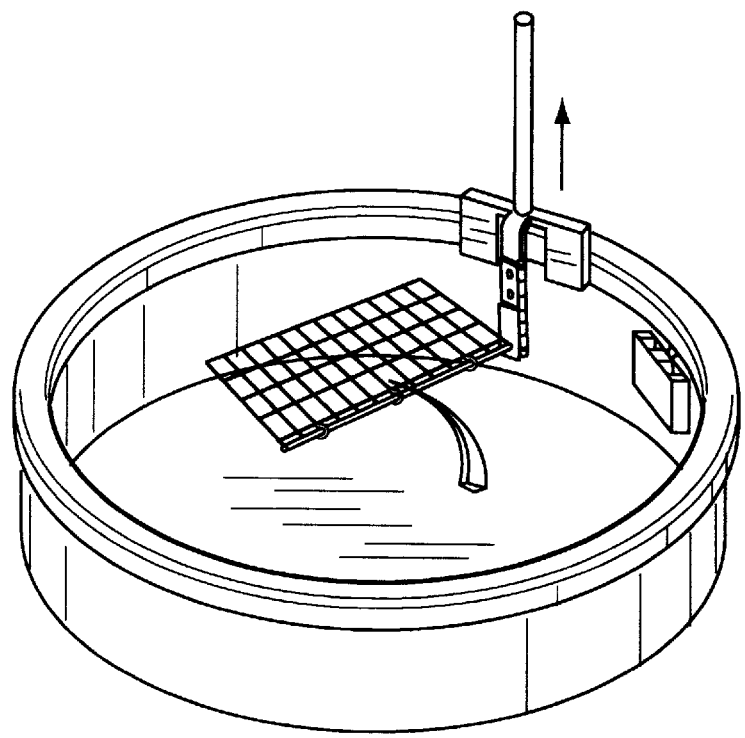
FIG. 25 is a perspective view showing the sieve and sieve unit being removed from the ring of the container.
Figure 26:
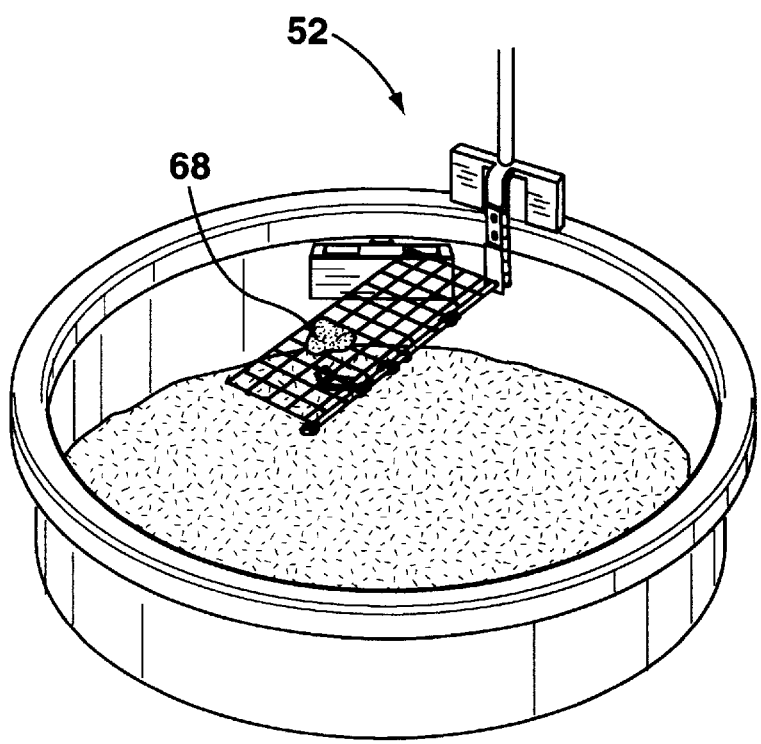
FIG. 26 is a similar to that of FIG. 25 but with extrement on the sieve.
Figure 26A:
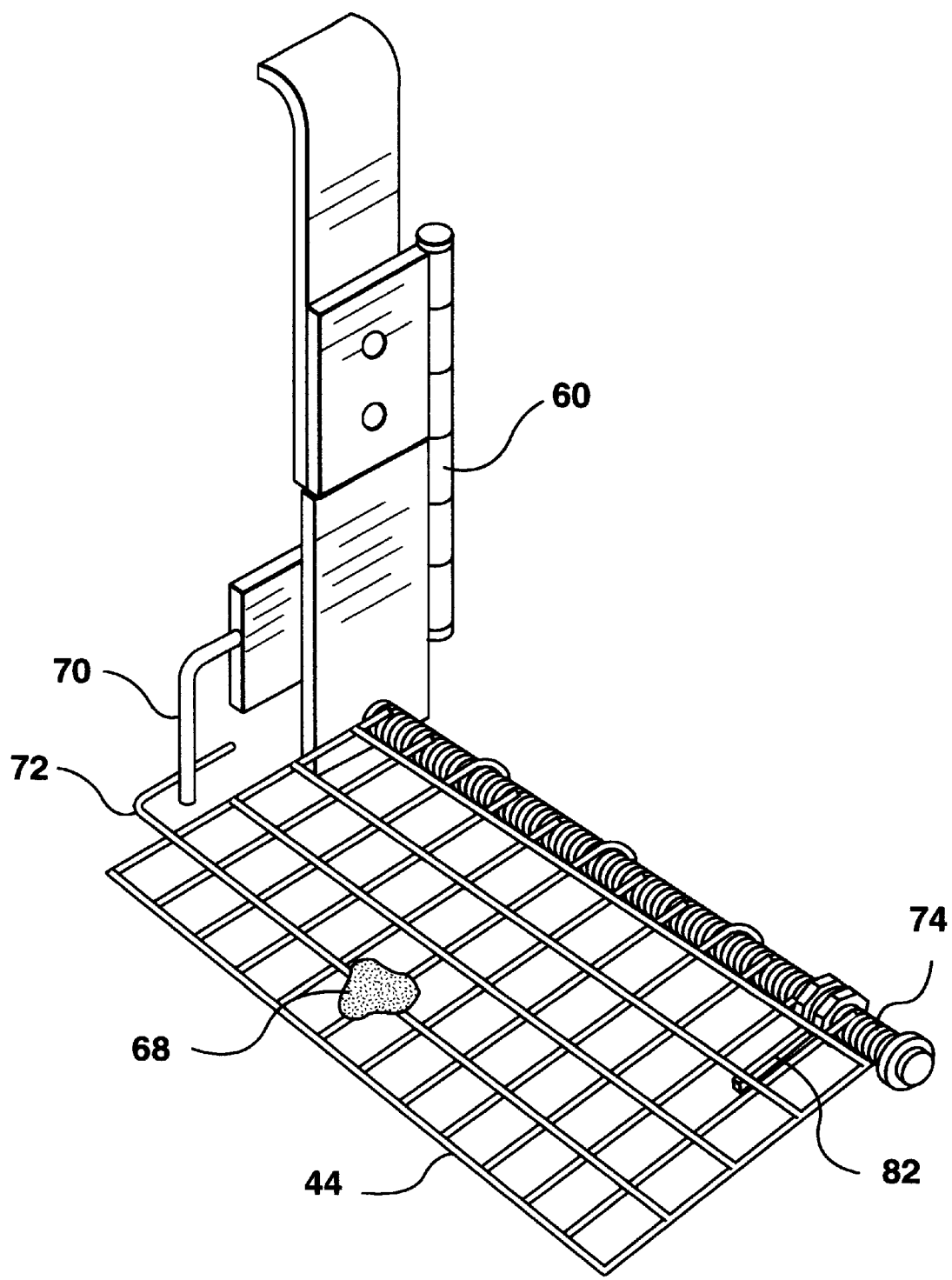
Figure 27:
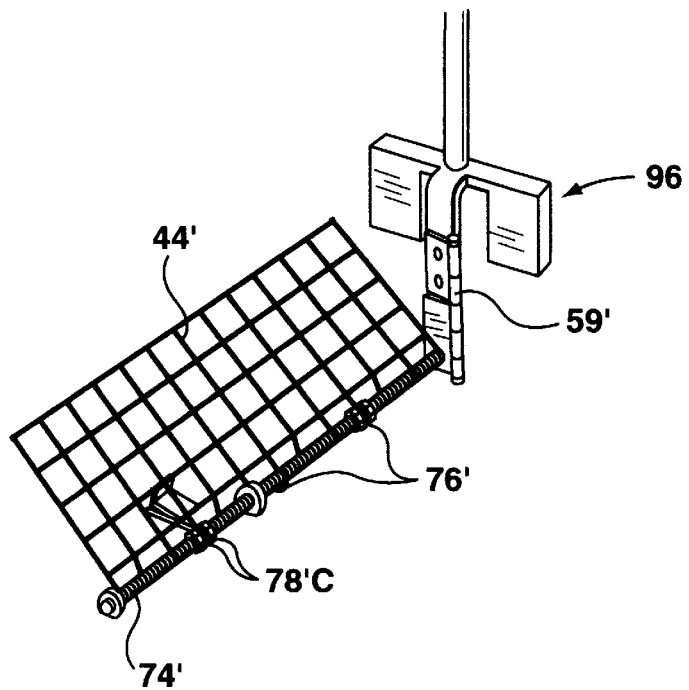
FIG. 27 is a perspective view showing the sieve unit with the sieve in a 60 degree sieving position for a second embodiment of the invention.
Figure 28:
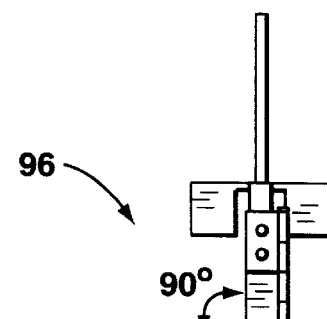
FIG. 28 shows the sieve in horizontal position for the embodiment in FIG. 27.
Figure 29:
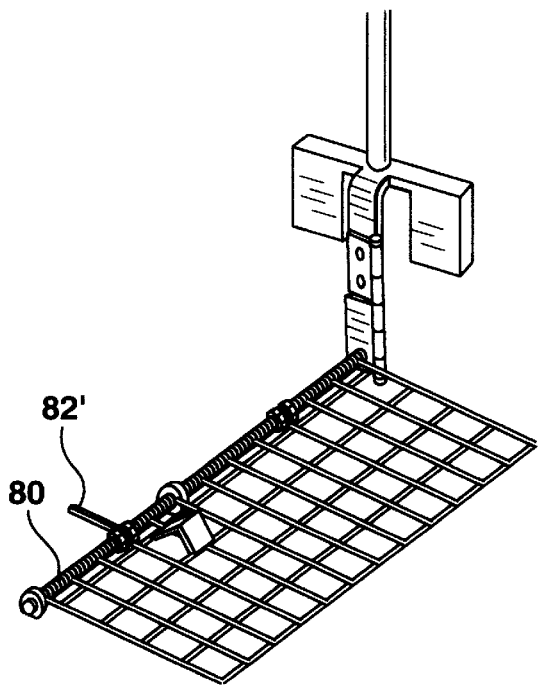
FIG. 29 shows the sieve in reverse horizontal position for the embodiment in FIG. 27.
Figure 30:
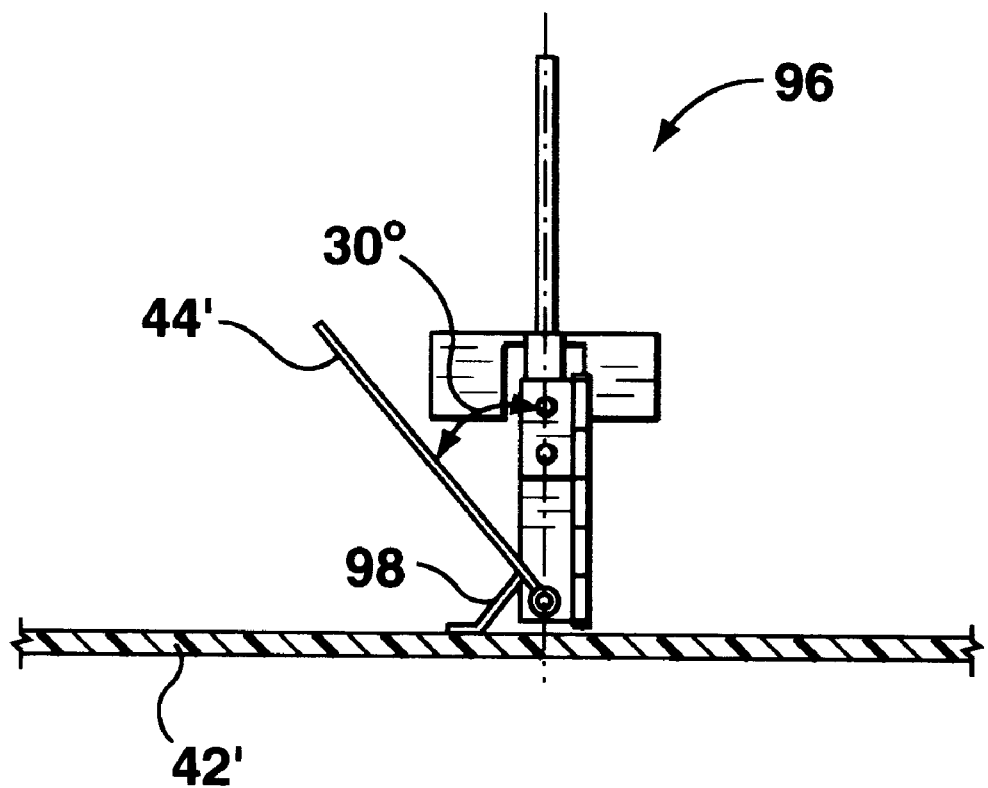
FIG. 30 is an end view showing the sieve in the 60-degree position of FIG. 27.

FIGS. 25 and 26 show the removal of waste. This occurs when the handle unit 52 is pulled upward thereby disengaging the entire sieving unit 51 from the ring 45. The screen 44 contains the captured waste. The sieving unit 51 now acts as a litter scoop. As the unit is pulled upward the screen 44 falls downward, rotating around the metal rod 74 as shown in FIG. 26-A. The downward rotation of the screen 44 is stopped as it comes to rest on the horizontal hold member 82. This leaves the screen 44 in a horizontal position relative to the container bottom 42 as long as the handle unit 52 is held in an upright position. FIG. 26-A also shows how the locking tab 72 has moved over the locking member 70 as the screen falls onto the horizontal hold member 82. The screen 44 is now held against the locking member 70. This keeps the metal rod 74 and screen 44 from rotating or swinging outward on the hinge 44 during removal of the waste 68.

After the sieving unit 51 has been emptied, it is reinstalled by pushing the prongs 54 into slots 58 until the sieve unit contacts and rests on the container bottom 42, at which time the device is ready for re-use.

DETAILED DESCRIPTION OF A SECOND EMBODIMENT

Reference is next made to FIGS. 27 to 38, which show a second embodiment of the invention similar in many respects to that of FIGS. 1 to 26. In FIGS. 27 to 38 primed reference numerals indicate parts corresponding to those of FIGS. 1 to 27. In the embodiment shown in FIGS. 27 to 38, the same circular container 41' is used as shown in FIGS. 1 to 26, with an encircling ring 45' also rotatable on the rim of the container 41'. However, the screen 44' construction is somewhat different and will now be described.

This paragraph outlines the parts of the sieve unit 96 as shown in FIGS. 27, 28, 29, and 30. The way in which these parts cause the unit to function will be described in more detail in subsequent paragraphs. Some of these parts are common to the sieve unit 51' described in the preferred embodiment. The screen 44' is hinged on a threaded metal rod 74' by having ends 76' of the metal grid work that make up the screen 44' wrapped around the rod 74'. The screen 44' is therefore rotatable on the rod 74'. The screen 44' is kept from sliding along the rod 74' by abutting two ends of the metal screen's gridwork 76' up against nuts 78' which are fixed in position on the rod 74'. The rod 74' is fixed to the bottom of the protrusion 59' on the handle unit 52' such that the rod 74' extends out from the handle unit 52' at a 90-degree angle, radial to the container side 43'. Affixed to the trailing side 80' of the rod 74' by two nuts 78' is a horizontal stop member 82'. This member 82' keeps the screen 44' from falling below the horizontal relative to the container bottom 42' when the entire sieving unit 96 is removed from the ring 45' and held in an upright position. Attached to the movable screen 44' is a positioning strut 98 (FIG. 30) similar to the positioning member 90' described in the previous embodiment. This positioning strut 98 serves three functions. While sieving in a clockwise direction it serves to hold the screen 44' at approximately a 60-degree position from the horizontal by supporting the screen 44' against the container bottom 42'. When the ring 45' and sieving unit 96 are rotated counter clockwise, the force of the clay litter 65' on this strut 98 helps to push the screen 44' flat against the container bottom 42'. When the ring 45' and sieving unit 96 are reversed once again in a clockwise direction, while the screen 44' is laying flat against the container bottom 42' surface, the force of the relative movement of the litter 65' against the positioning strut 98 helps to cause the screen 44' to rotate around the metal rod 74' to an upright or sieving position.

The following paragraphs describe the functioning of the second embodiment of the sieve unit 96.

Figure 31:
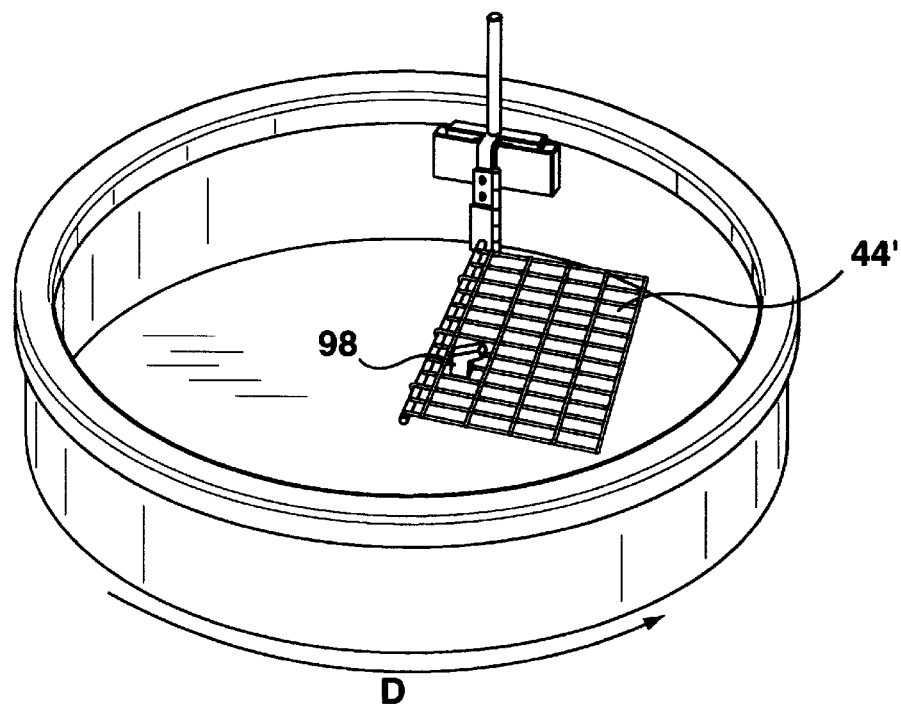
FIG. 31 is a perspective view of the second embodiment of the invention showing the sieve in the container in horizontal position.
Figure 32:
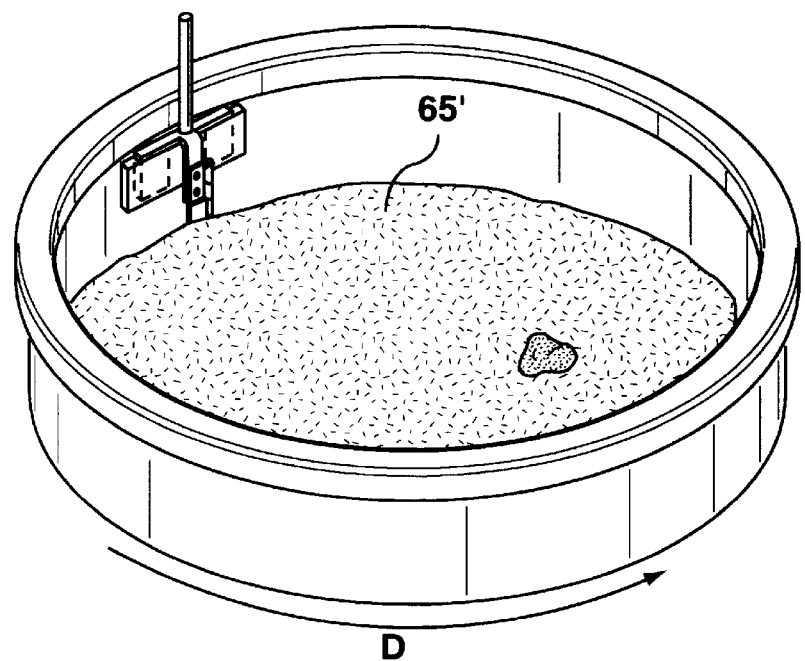
FIG. 32 shows the sieve buried beneath the litter for the second embodiment of the invention.

FIGS. 31 and 32 show the screen 44' in a resting or hidden position buried underneath the litter 65'. The ring 45' and sieve unit 96 has been rotated counter-clockwise in the direction of Arrow D. The force of the relative movement of the clay litter 65' pushes against the positioning strut 98 which in turn pushes the screen 44' down against the container bottom 42'.

Figure 33:
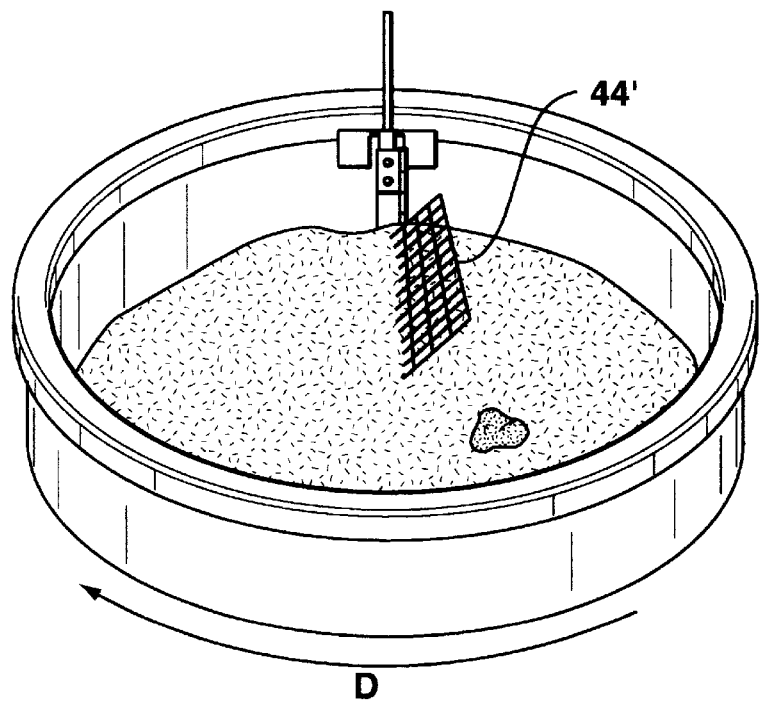
FIG. 33 is a perspective view showing the sieve rising from the litter in the second embodiment of the invention.
Figure 34:
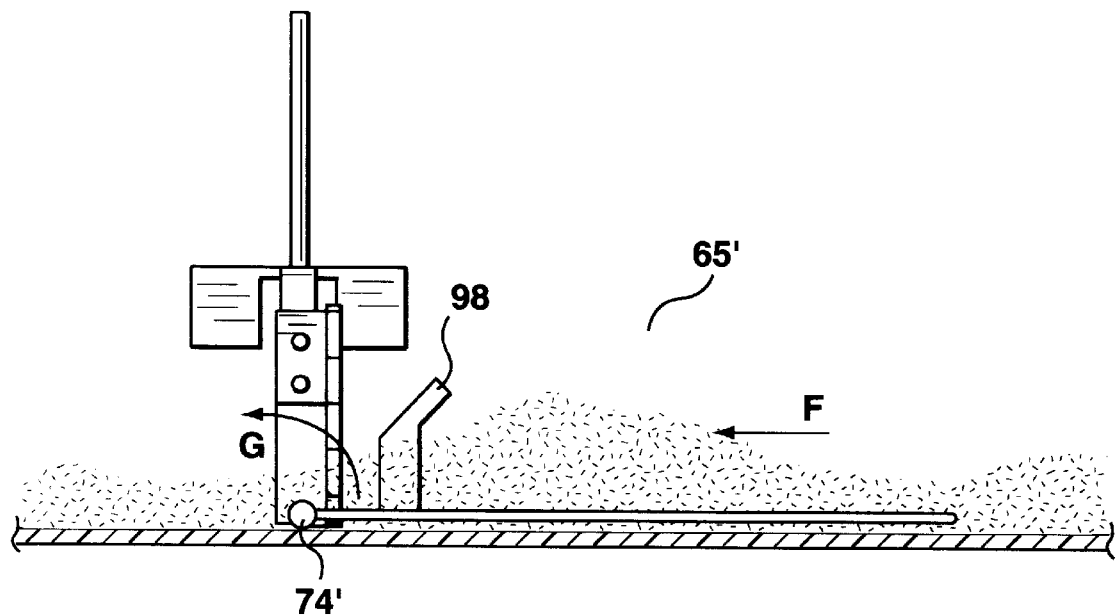
FIG. 34 is an end view showing movement of the sieve in the second embodiment of the invention.

FIG. 33 shows the screen 44' moving up from the resting position as the ring 45' and sieve unit 96 are rotated in a clockwise direction in the direction of Arrow E. FIG. 34 shows that as the ring 45' is rotated clockwise the force of the relative movement of the litter 65' against the positioning strut 98 pushes the strut 98 upward and backward, which causes the screen 44', to which the strut 98 is attached, to pull upwardly. Arrow F (FIG. 34) shows the direction of the force of the litter 65' on the positioning strut 96, while Arrow G shows the direction of rotation of the screen 44'. As the screen 44' moves upward the force of the relative movement of the litter 65' against the screen 44' itself helps bring 44' the screen upward.

Figure 35:
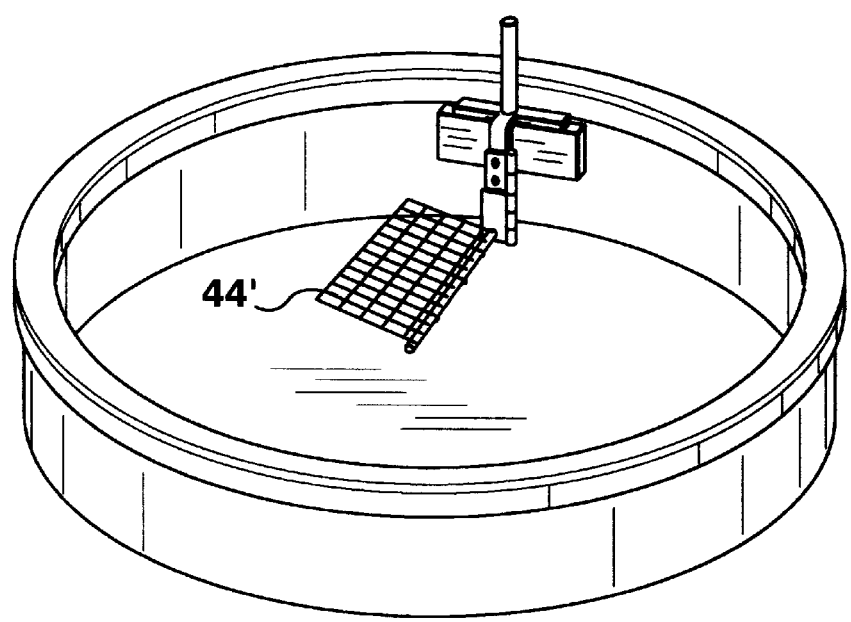
FIG. 35 shows the sieve in sieving position in the second embodiment.
Figure 36:
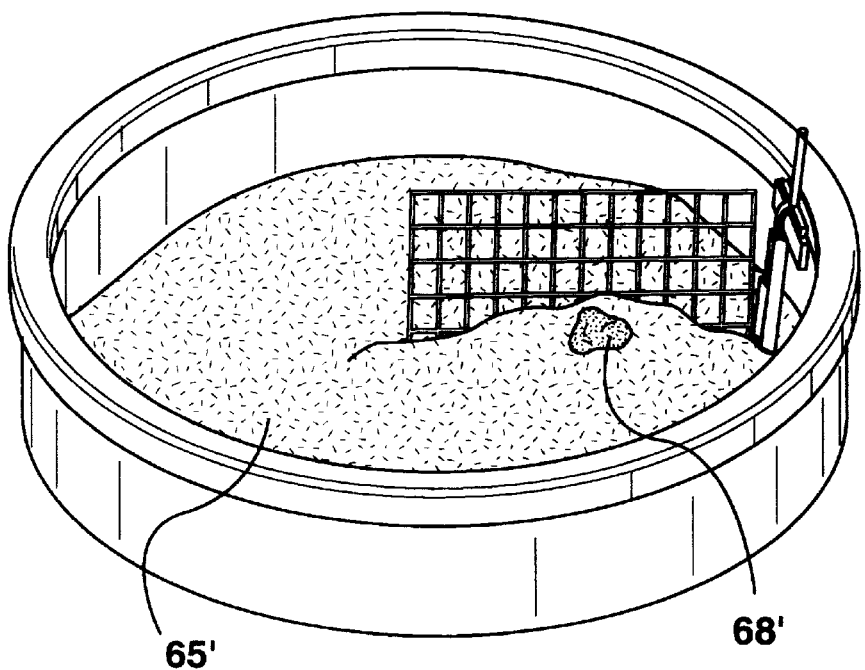
FIG. 36 is a perspective view showing the sieve in sieving position in the second embodiment.

FIGS. 35 and 36 show the screen 44' in the sieving position. The positioning strut 98, which is fixed on the screen 44' with glue, is resting on and dragging along the container bottom 42'. The strut 98 is supporting the screen 44' at approximately a 60-degree angle. The screen 44' captures the solid clump of waste 68' contained within the litter 65'. The angle of the screen 44' causes the solid waste 68' to rise to the surface of the litter 65'.

Figure 37:
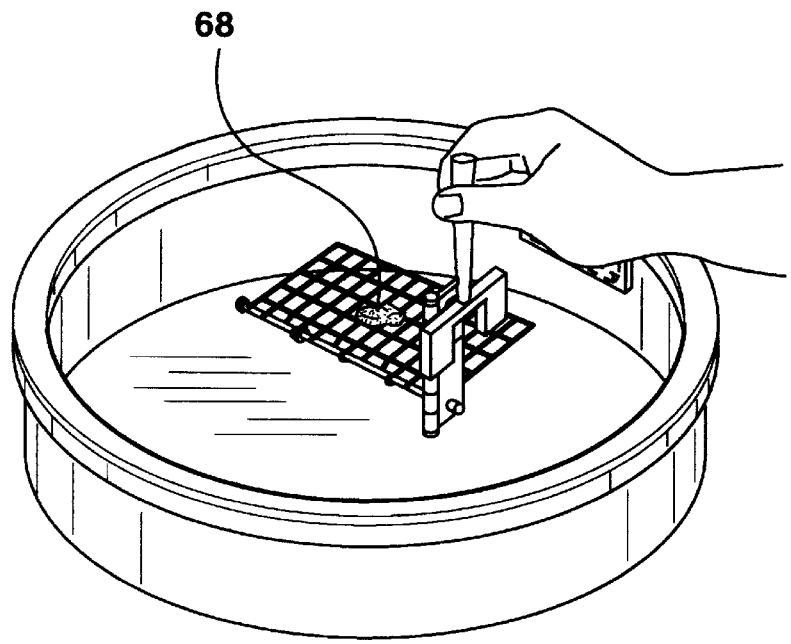
FIG. 37 shows the sieve unit being removed from the ring in the second embodiment.
Figure 38:
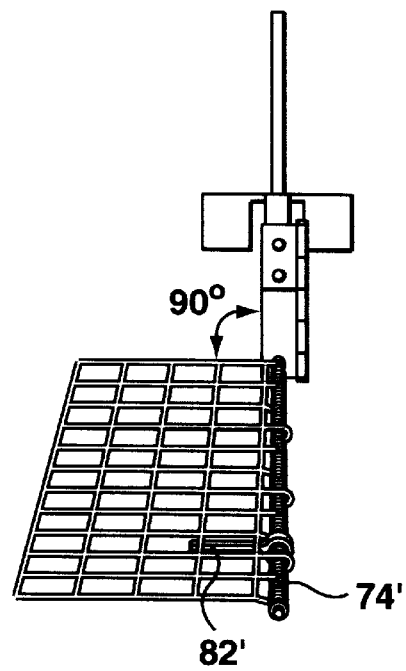
FIG. 38 shows the sieve unit being raised to remove extrement from the container, in the second embodiment.

FIG. 37 shows the sieve unit 96 being removed from the ring 45' with the waste 68' contained on the front surface of the screen 44'. As handle unit 96 is lifted, the screen 44' drops down, rotating on the metal rod 74', until the screen 44' comes to rest on the horizontal stop member 82'. The screen 44' remains horizontal relative to container bottom 42' as long as the handle unit 52' is held upright as shown in FIG. 38.

DETAILED DESCRIPTION OF THIRD EMBODIMENT

Reference is next made to FIGS. 39 to 42, which show a third embodiment of the invention similar in most respects to that of the previous embodiments, and in which corresponding reference numerals indicate corresponding parts. The third embodiment differs from the previous versions in the arrangement by which the handle unit is mounted for rotation around the container 41".

In the third embodiment, a track portion 100 formed on the container wall, and a carriage 103 which mounts the handle unit 52", are used in place of the circular ring shown in the first and second embodiments, to allow the sieve unit 51", 96" to rotate around the container 41".

Figure 39:
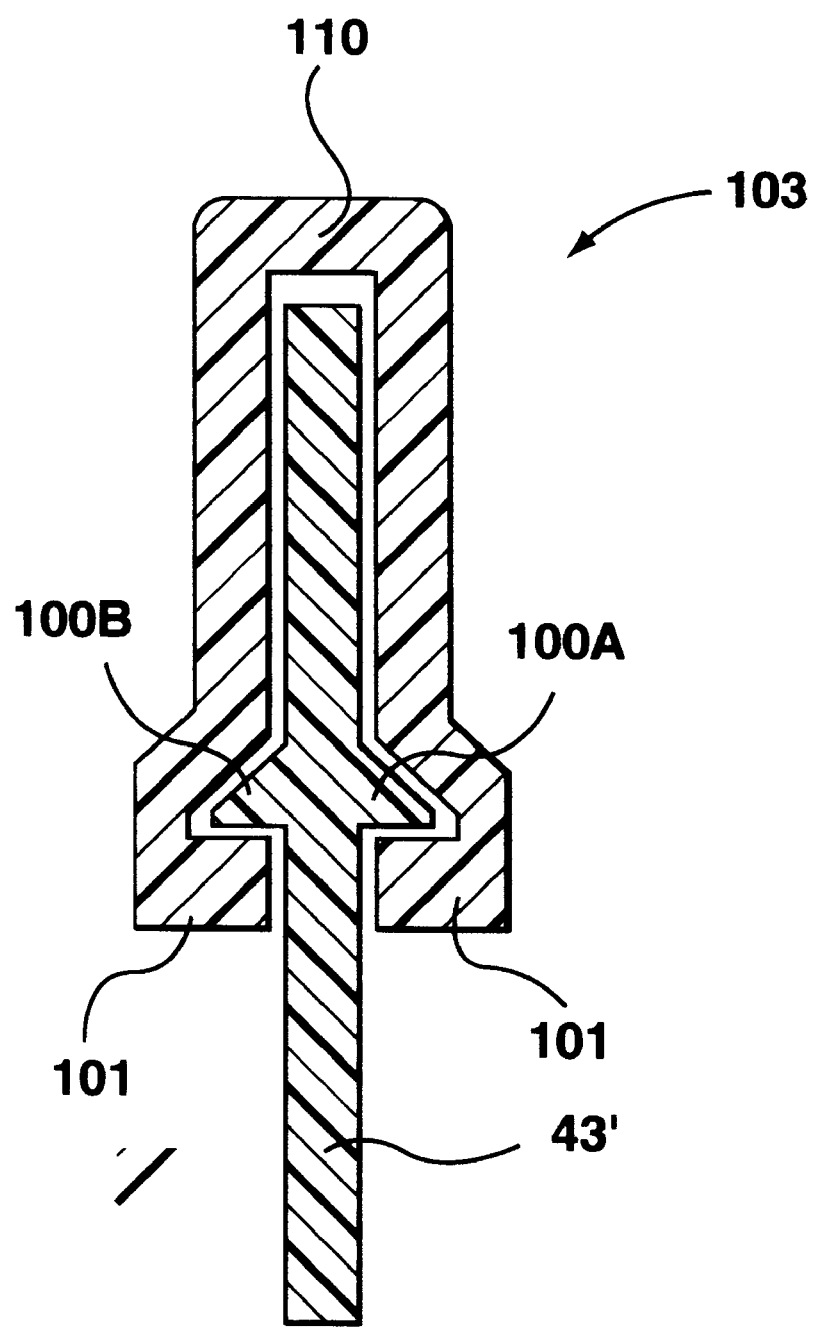
FIG. 39 is a sectional view of the container sidewall and carriage of a third embodiment of the invention.
Figure 40:
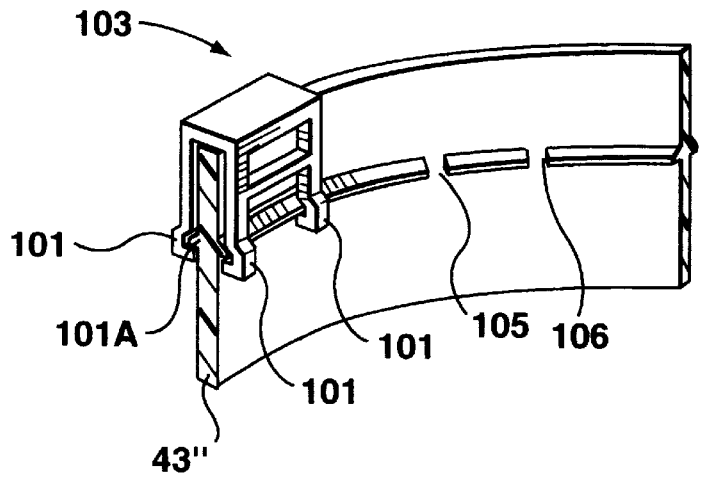
FIG. 40 is a perspective view of a portion of the litter container of the third embodiment with the carriage mounted thereon.
Figure 41:
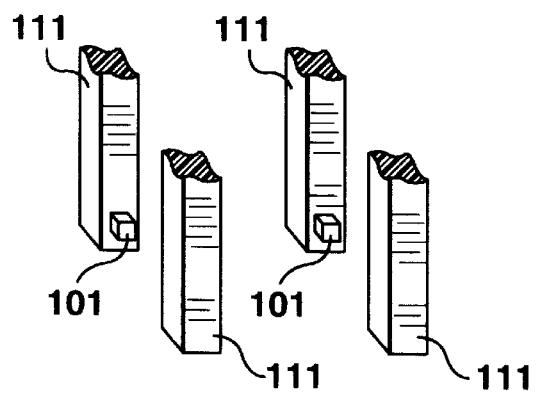
FIG. 41 is a perspective view showing the carriage legs of the third embodiment.

As shown in FIGS. 39 and 40, the track portion 100 is formed in the container wall 43 and consists of two radial protrusions 100A projecting radially outwardly and 100B projecting radially inwardly, both encircling the circumference of the container wall 43". The track portion 100 is preferably molded into the container wall 43" when the container is formed.

The carriage 103 fits over the container sidewall 43" and over the track portion 100 and movable along the sidewall 43". As will be described, the carriage 103 may have the receptacle 55" built into it to hold the sieve units 51" or 96". Alternatively the sieve units 51", 96" may be directly attached to the carriage, as shown in FIG. 42, and the entire carriage unit 103 with sieve 51" or 96" can be removable from the container 41".

As shown in FIGS. 39, 40, the carriage has a top wall 110, which rests on top of the container wall 43". Attached to the top wall 110 are legs 111, which extend downwardly over opposite sides of the container wall and are spaced circumferentially from each other. The legs 111 fit reasonably snuggly against the container wall 43". Since the legs 111 are the only part of the carriage which ride against the sides of the container wall 43", therefore the carriage is able to move along a container wall 43" whether the wall is round, or whether has a more oval or even rectangular shape so long as the corners are sufficiently rounded. The sidewall 43", including its top surface, its sides, and the track portions 100A, 100B, thus forms a track for carriage 103.

At the bottom of each of the four legs 111 is a protrusion 101 which extends toward the container wall 43. The protrusion 101 fits just below the lower surfaces of the track portion 100. With this arrangement, the carriage 103 may be pushed downwardly onto the container wall until the protrusions 101 snap over the track portion 100, at which time the carriage 103 will be locked in position on the container wall 43". Since it is locked in position, it cannot inadvertently be removed, although if required it can be removed by spreading the legs 111.

Figure 42:
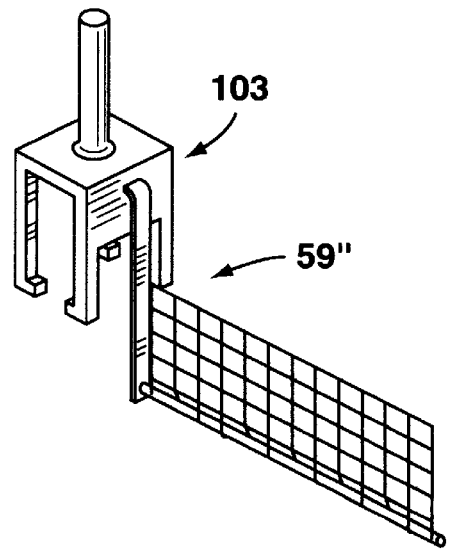
FIG. 42 is a perspective view showing the carriage of FIG. 40 with the sieve unit attached thereto.

If the handle unit is built into the carriage unit 103, then the downwardly extending projection 59" is molded or otherwise fixedly attached to the carriage 103 as shown at 59" in FIG. 42. In this case, the carriage 103 itself must be removable from the tracks 100. A simple way of making the carriage 103 removable from the tracks 100 is to provide gaps 105, 106 in both sides of the track 100. The gaps 105, 106 are each slightly wider then a leg 111 and are spaced apart to correspond with the spacing of the legs 111. Thus, when the carriage reaches the gaps 105, 106, it can simply be lifted upwardly off the container wall 43". There is no danger of the carriage 103 falling where the gaps 105,106 occur, since at this position (and indeed in all positions) the carriage is supported by its top wall riding on the container top surface.

If the sieve unit is removably attached to the carriage 103, then the same arrangement as that shown in FIG. 9 may be used, in which the prongs 54" may project into slots 58" (FIG. 41) molded into the carriage 103. The slots 58" perform the same function as the slots 58 in receptacle 55" of FIG. 9. In this case, of course, no gaps need be left in the tracks 100.

An advantage of the third embodiment is that less plastic may be required then that needed to produce the ring 45, which may result in lower costs. In addition, as mentioned, the track and carriage construction shown allows the sieve unit to be rotated around containers that are not round.

DETAILED DESCRIPTION OF FOURTH EMBODIMENT

Figure 43:
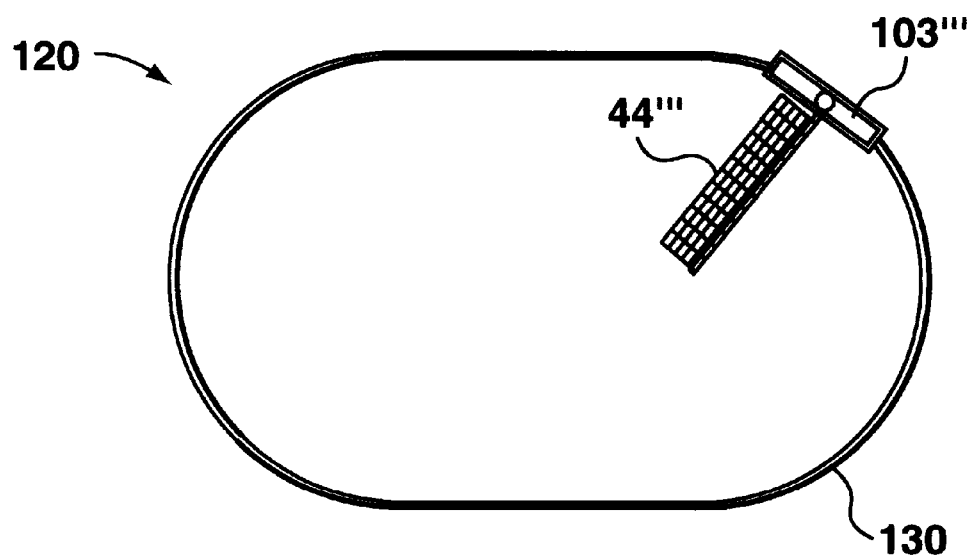
FIG. 43 is a top view of a fourth embodiment of a litter container according to the invention with the sieve unit in place thereon.
Figure 44:
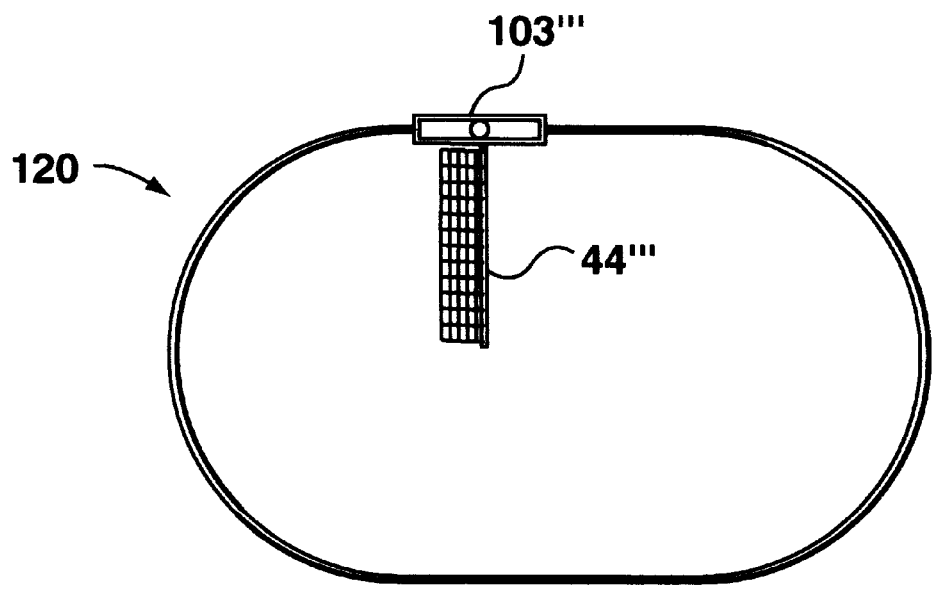
FIG. 44 is a top view of the FIG. 43 litter container with the sieve unit in a different location on the container sidewall.
Figure 45:
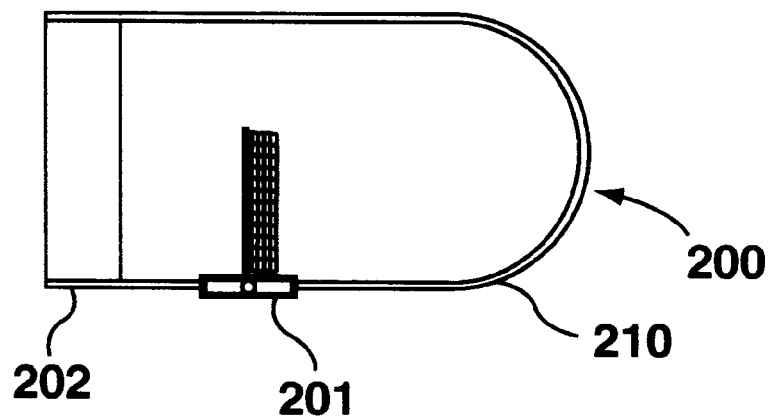
FIG. 45 is a top view of another embodiment of a litter container of the invention.
Figure 46:
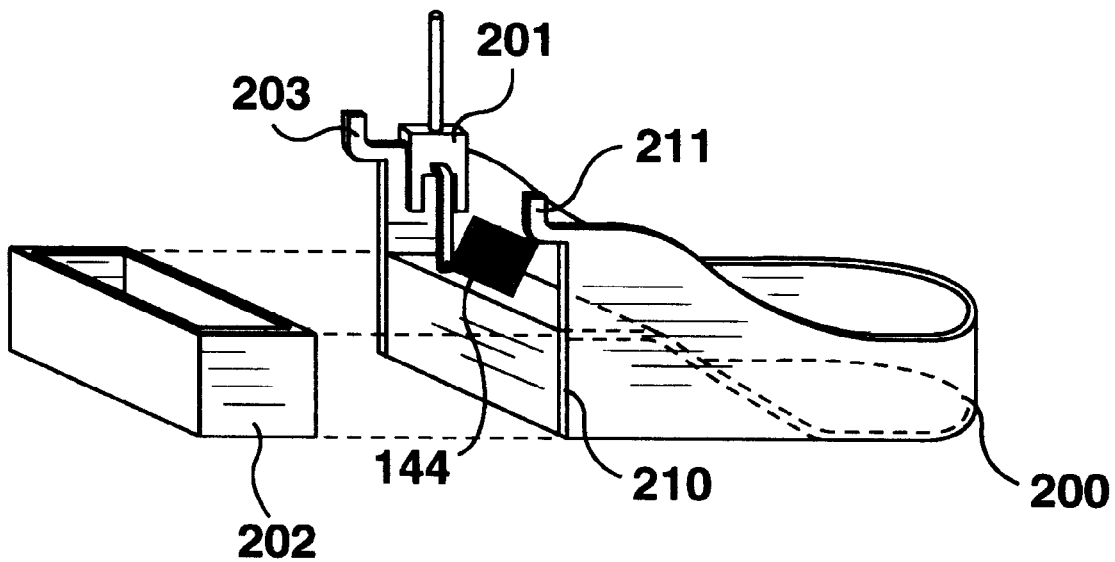
FIG. 46 is a perspective view of the FIG. 45 litter container with a receptacle detached therefrom.

A fourth embodiment of the invention is shown in FIGS. 43, 44 and is the same in that shown in the third embodiment, except that instead of the round container, an oval container 120 is used. An oval container may be used because it is preferred from an aesthetic view, or because this shape fits available spaces more efficiently than a round container.

In the fourth embodiment, the circular ring 45 clearly cannot be used. However the track portion 100 and carriage 103 described in the third embodiment may be used. Such a carriage 103'" is shown in FIGS. 43, 44. The construction of the carriage 103'" allows it to travel along either a flat or a curved wall, as it does not have a fixed curvature, which must match the curvature of the container wall. Preferably carriage 103'" is made of a flexible and resilient plastic, which can flex if needed to adapt to the curvature of the container wall.

As shown in FIGS. 43, 44, the sieve 44'" extends into the oval container 120 to an extent equal to at least one half the length of the shortest "diameter" of oval container. (However as shown in FIGS. 43, 44 and in all the other drawings, the sieve extends less than all of the way across the diameter of the litter container.) The arrangement shown enables the sieve 44'" to pass through all of the litter material in the oval container 120 with one complete revolution of the carriage 103 and sieve 44'".

It should be noted that while the fourth embodiment describes an oval container, the container shape need not be limited to being oval. Almost any closed shape may be used, so long as the container has rounded corners around which the carriage can travel. For example, and as mentioned, a substantially rectangular container can be used, with sufficiently rounded corners.

DESCRIPTION OF FIFTH EMBODIMENT

In the embodiments previously described the sieve when not in use is stored in the container, by moving it to a position in which it does not interfere with the cat's use of the container. However if desired, the mechanisms described can be simplified by eliminating the arrangement in which the sieve moves to an out-of-the-way position when the sieving unit is not in use. In this version, the sieve mechanism is simply removed from the container when sieving is not being performed and is stored outside the container. This version has the disadvantage that sieve unit must to be re-installed in position each time the container contents are to be sieved, and in addition a separate storage location must be found for it. Therefore this version is not preferred, although it can be used if desired.

DESCRIPTION OF SIXTH EMBODIMENT

Figure 51:
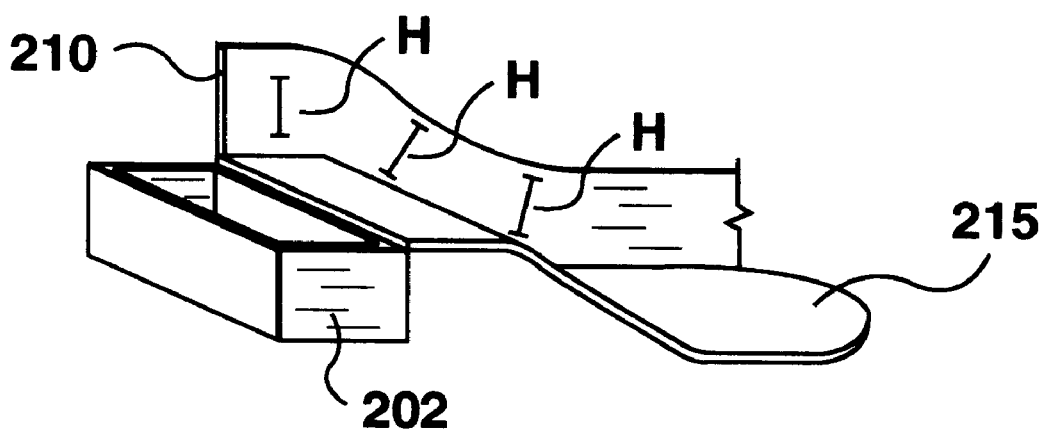
FIG. 51 is a perspective view showing the bottom wall and a portion of the sidewall of the FIG. 46 litter container.

Reference is next made to FIGS. 45 to 51 which show a modified litter container 200. Container 200 is of oval shape at one side thereof, but terminates in an auxiliary container 202 at one end thereof. As shown, litter container 200 rises in elevation as it extends toward auxiliary container 202. Carriage 201 (which can be the same as carriage 103 of FIGS. 39 to 42) travels along the sidewall 210 of litter container 200 and as it approaches auxiliary container 202, carriage 201 rises on the rising sidewall 210 of container 200 until it reaches the end of container 200, at which point it is prevented from coming off the track by a stop 203. At this point the sieve 44 discharges its scooped contents into auxiliary container 202. The container bottom 215 and container sidewall 210 are designed such that the rise of the container wall 210 matches the rise of the container bottom 215, so that as shown in FIG. 51, the top of sidewall 210 is always at a constant height h above the bottom wall 215. Thus, as the carriage 201 rises upwards along the track portion as it moves toward the receptacle 202 (in either direction on sidewall 210), the bottom of the sieve 44 rests on, or remains very close the the container bottom 215 (FIG. 51).

Figure 47:
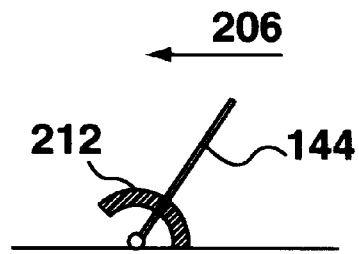
FIG. 47 is a side sectional view of the sieve and support member.
Figure 48:
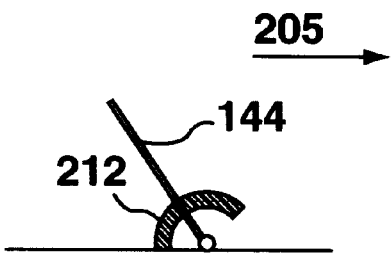
FIG. 48 is a side sectional view like FIG. 47 but showing the sieve at a different angle.
Figure 49:
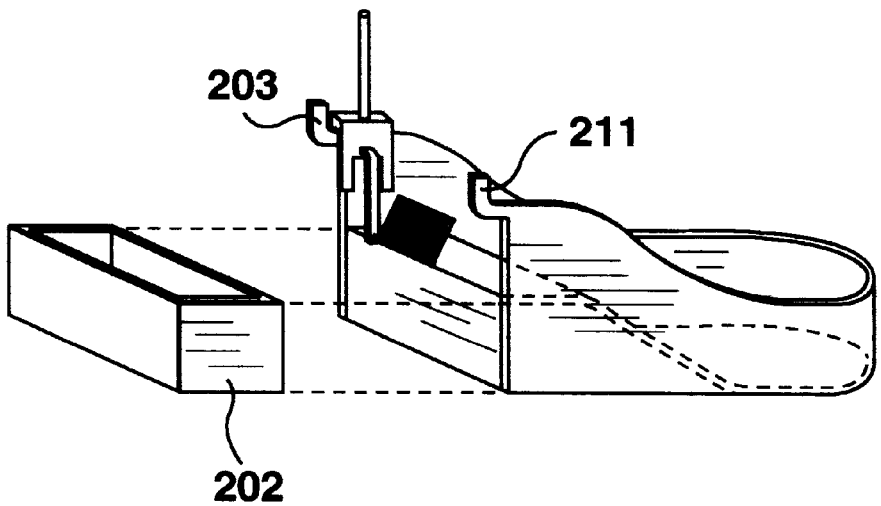
FIG. 49 is a perspective view similar to FIG. 46 but showing the sieve stopped at one end of the container sidewall.
Figure 50:
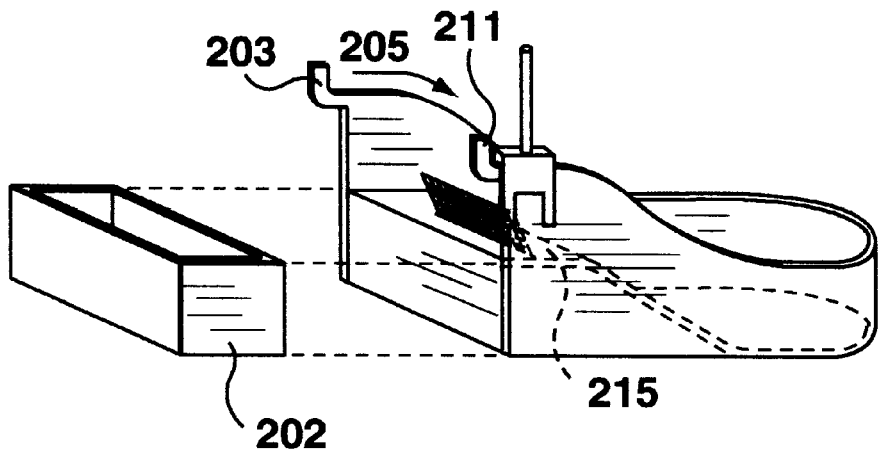
FIG. 50 is a perspective view similar to FIG. 49 but showing the sieve stopped at the other end of the container sidewall.

When reversed, the sieve 44 rotates in an opposite direction so that it can scoop when moved in this direction, as indicated by arrow 205, so that the sieve 44 moves through the litter material and terminates its movement at a second stop 211 as shown in FIGS. 49, 50, again to discharge its contents into auxiliary container 202. FIGS. 47, 48 show the position of the sieve 44 in two positions it obtains when being moved in the direction as shown by arrow 205 and arrow 206. A support member 212 (which may be similar to members 90, 98) and hence extends from both sides of sieve 44, is used to hold the sieve at approximately a 60 degree angle to the horizontal, relative to the container 200 bottom while being moved in either direction. It will be seen that in this embodiment, the track formed by the sidewall 202, although discontinuous (unlike the previous version), extends around an arc of 180% so that sieve 144 can reach all the litter in the container.

While the sidewall 43, 210 has been shown as being vertical with respect to the bottom wall, if desired, the sidewall can be oriented at an angle to the bottom wall other than 90 degrees, and the angle of the screen can be adjusted accordingly so that the sieve remains parallel to the bottom wall.

As another modification the container wall and the inside wall and outside walls of the ring may be modified in such a way that an exit for the waste is provided through the container wall. Openings may be made in the container wall and in the inside wall of the ring such that as the ring is rotated the two openings will be aligned with one another for a brief period thereby creating a hole in the wall of the container from which the waste could pass to the outside of the container. The inside wall of the ring would further down into the container wall to accommodate this discussed modification.

As yet another modification a motor unit and controller unit may be used to automate the clockwise and counter-clockwise motion of the ring or a carriage.

The foregoing discussion and embodiments are presented as illustrative and should not be taken as limiting. Other variations within the spirit and scope of this invention are possible and will present themselves to those skilled in the art.

I claim:

1. A litter container comprising a container having a bottom wall and a continuous sidewall extending through 360 degrees of arc, a sieve, a mounting mechanism mounting said sieve on said sidewall for movement of said sieve all of the way around said sidewall with said sieve extending into said container and being oriented at least partially vertically for travel throughout the litter material in said container as said sieve travels around said sidewall for collection of waste in said container, said sieve extending less than all of the way across said container, said mounting mechanism permitting detachment of said sieve from said sidewall for emptying waste from said sieve.

2. A litter container according to claim 1 wherein said mounting mechanism orients said sieve horizontally for removal of said sieve from said container.

3. A litter container according to claim 2 wherein said mounting mechanism includes a pivot permitting said sieve to be stored against the side of said container in a vertical position, said sieve having an outer end and said bottom wall of said container including a track cooperating with said outer end of said sieve to move said outer end of said sieve outwardly away from said sidewall when said sieve is rotated for collection of waste in said container.

4. A litter container according to claim 1 wherein said mounting mechanism includes a pivot permitting said sieve to lie against the bottom of said container for storage out of the way of an animal using the container.

5. A litter container according to claim 1 wherein said mounting mechanism includes a carriage mounted on said sidewall for movement therealong, said sieve being connected to said carriage, said carriage including a top wall and a plurality of legs projecting downwardly from said top wall on each side of said sidewall of said container, said legs being spaced circumferentially apart.

6. A litter container according to claim 1 in which the sidewall is circular.

7. A litter container according to claim 1 in which the sidewall is oval.

8. A litter container according to claim 1 in which the sidewall is rectangular with rounded corners.

* * * * *